(12) United States Patent
Loehr et al.

(10) Patent No.: US 11,005,640 B2
(45) Date of Patent: *May 11, 2021

(54) COMPONENT CARRIER ACTIVATION AND DEACTIVATION USING RESOURCE ASSIGNMENTS

(71) Applicant: Sun Patent Trust, New York, NY (US)

(72) Inventors: Joachim Loehr, Wiesbaden (DE); Alexander Golitschek Edler von Elbwart, Darmstadt (DE); Martin Feuersaenger, Bremen (DE)

(73) Assignee: Sun Patent Trust, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/867,426

(22) Filed: May 5, 2020

(65) Prior Publication Data

US 2020/0336271 A1 Oct. 22, 2020

Related U.S. Application Data

(63) Continuation of application No. 16/401,998, filed on May 2, 2019, now Pat. No. 10,686,580, which is a
(Continued)

(30) Foreign Application Priority Data

Feb. 12, 2010 (EP) .................................. 10153484

(51) Int. Cl.
*H04L 5/00* (2006.01)
*H04L 1/00* (2006.01)
(Continued)

(52) U.S. Cl.
CPC .......... *H04L 5/0098* (2013.01); *H04L 1/0026* (2013.01); *H04L 1/0046* (2013.01);
(Continued)

(58) Field of Classification Search
CPC ............................ H04W 72/04; H04W 72/002
See application file for complete search history.

(56) References Cited

U.S. PATENT DOCUMENTS 9,220,107 B2 12/2015 Loehr et al.
9,414,387 B2 8/2016 Loehr et al.
(Continued)

FOREIGN PATENT DOCUMENTS

CN 101340622 A 1/2009
CN 101631333 A 1/2010
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 8)," Technical Specification, 3GPP TS 36.211 V8.9.0, Dec. 2009, 83 pages.
(Continued)

*Primary Examiner* — Kevin C. Harper
(74) *Attorney, Agent, or Firm* — Seed IP Law Group LLP

(57) ABSTRACT

This invention relates to a proposal of an uplink resource assignment format and a downlink resource assignment format. Furthermore, the invention relates to the use of the new uplink/downlink resource assignments in methods for (de)activation of downlink component carrier(s) configured for a mobile terminal, a base station and a mobile terminal. To enable efficient and robust (de)activation of component carriers, while minimizing the signaling overhead, the invention proposes a new uplink/downlink resource assignment format that allow the activation/deactivation of individual downlink component carriers configured for a mobile. The new uplink or downlink resource assignment comprises an indication of the activation state of the configured downlink component carriers, i.e., indicate which downlink component carrier(s) is/are to be activated or
(Continued)

deactivated. This indication is for example implemented by means of a bit-mask that indicates which of the configured uplink component carriers are to be activated respectively deactivated.

14 Claims, 14 Drawing Sheets

Related U.S. Application Data continuation of application No. 15/906,725, filed on Feb. 27, 2018, now Pat. No. 10,333,685, which is a continuation of application No. 15/687,086, filed on Aug. 25, 2017, now Pat. No. 9,942,022, which is a continuation of application No. 15/374,195, filed on Dec. 9, 2016, now Pat. No. 9,774,437, which is a continuation of application No. 15/202,444, filed on Jul. 5, 2016, now Pat. No. 9,554,386, which is a continuation of application No. 14/727,719, filed on Jun. 1, 2015, now Pat. No. 9,414,387, which is a continuation of application No. 14/464,266, filed on Aug. 20, 2014, now Pat. No. 9,220,107, which is a continuation of application No. 13/577,861, filed as application No. PCT/EP2011/000473 on Feb. 2, 2011, now Pat. No. 8,855,132.

(51) Int. Cl.
| | |
|---|---|
| H04W 52/14 | (2009.01) |
| H04W 52/34 | (2009.01) |
| H04W 52/36 | (2009.01) |
| H04W 52/30 | (2009.01) |
| H04W 72/04 | (2009.01) |
| H04W 24/08 | (2009.01) |
| H04L 1/16 | (2006.01) |
| H04L 25/03 | (2006.01) |
| H04W 72/00 | (2009.01) |

(52) U.S. Cl.
CPC ............ *H04L 5/001* (2013.01); *H04L 5/0048* (2013.01); *H04L 5/0053* (2013.01); *H04L 5/0055* (2013.01); *H04L 5/0057* (2013.01); *H04L 5/0096* (2013.01); *H04W 24/08* (2013.01); *H04W 52/146* (2013.01); *H04W 52/30* (2013.01); *H04W 52/34* (2013.01); *H04W 52/343* (2013.01); *H04W 52/365* (2013.01); *H04W 72/0453* (2013.01); *H04L 1/0038* (2013.01); *H04L 1/0061* (2013.01); *H04L 1/0072* (2013.01); *H04L 1/1657* (2013.01); *H04L 25/03866* (2013.01); *H04W 72/00* (2013.01); *H04W 72/042* (2013.01)

(56) References Cited

U.S. PATENT DOCUMENTS

| | | | |
|---|---|---|---|
| 9,554,386 | B2 | 1/2017 | Loehr et al. |
| 9,774,437 | B2 | 9/2017 | Loehr et al. |
| 9,942,022 | B2 | 4/2018 | Loehr et al. |
| 10,333,685 | B2 | 6/2019 | Loehr et al. |
| 10,686,580 | B2 * | 6/2020 | Loehr .................. H04W 24/08 |
| 2007/0287459 | A1 * | 12/2007 | Diachina .............. H04B 17/382 455/436 |
| 2008/0089281 | A1 | 4/2008 | Yoon et al. |
| 2009/0046641 | A1 | 2/2009 | Wang et al. |
| 2009/0257371 | A1 | 10/2009 | Nishio |
| 2009/0257387 | A1 | 10/2009 | Gholmieh et al. |
| 2010/0034176 | A1 | 2/2010 | Heo et al. |
| 2010/0098012 | A1 | 4/2010 | Bala et al. |
| 2010/0182964 | A1 | 7/2010 | Ojala et al. |
| 2010/0226326 | A1 | 9/2010 | Ahn et al. |
| 2010/0322158 | A1 | 12/2010 | Lee et al. |
| 2011/0064042 | A1 | 3/2011 | Kim et al. |
| 2011/0305290 | A1 | 12/2011 | Kim et al. |
| 2012/0120838 | A1 | 5/2012 | Farajidana et al. |
| 2012/0243498 | A1 | 9/2012 | Kwon et al. |
| 2012/0294213 | A1 | 11/2012 | Chen et al. |
| 2012/0300743 | A1 | 11/2012 | Kim et al. |

FOREIGN PATENT DOCUMENTS

| | | |
|---|---|---|
| JP | 2013-513321 A | 4/2013 |
| JP | 6455688 B2 | 1/2019 |
| WO | 2010/013970 A2 | 2/2010 |

OTHER PUBLICATIONS

"3rd Generation Partnership Project; Technical Specification Group Radio Access Network; Evolved Universal Terrestrial Radio Access (E-UTRA); Physical Channels and Modulation (Release 9)," Technical Specification, 3GPP TS 36.211 V9.0.0, Dec. 2009, 85 pages.
"3rd Generation Partnership Project; Technical Specification Group Radio Access Network; Evolved Universal Terrestrial Radio Access (E-UTRA); Multiplexing and channel coding (Release 8)," Technical Specification, 3GPP TS 36.212 V8.8.0, Dec. 2009, 60 pages.
"3rd Generation Partnership Project; Technical Specification Group Radio Access Network; Evolved Universal Terrestrial Radio Access (E-UTRA); Multiplexing and channel coding (Release 9)," Technical Specification, 3GPP TS 36.212 V9.0.0, Dec. 2009, 61 pages.
Ericsson, Qualcomm Europe, "Text Proposal for DC-HSDPA assumptions and standards impact," R1-082249, Agenda Item: 10, 3GPP TSG-RAN WG1 Meeting #53, Kansas City, MO, USA, May 5-9, 2008, 22 pages.
Ericsson, ST-Ericsson, "Summary of the email discussion [68423] LTE:CC activation / deactivation," R2-100079, 3GPP TSG-RAN WG2 #68bis, Agenda Item: 7.1.3, Valencia, Spain, Jan. 18-22, 2010, 17 pages.
ETSI TS 136 212 V9.0.0, "LTE; Evolved Universal Terrestrial Radio Access (E-UTRA); Multiplexing and channel coding (3GPP TS 36.212 version 9.0.0 Release 9)," Jan. 2010, pp. 39-42, 6 pages.
International Search Report, dated May 19, 2011, for International Application No. PCT/EP2011/000473, 3 pages.
Japanese Notice of Reasons for Rejection dated Aug. 26, 2014, for corresponding JP Application No. 2012-552296, 8 pages (W/ English Translation).
NEC Group, "PDCCH Structure for LTE-Advanced System," R1-091692, TSG-RAN WG1#57, Agenda Item: 15.4, San Francisco, CA, US, May 4-8, 2009, 8 pages.
Notification of First Office Action dated Oct. 8, 2014, for corresponding CN Application No. 201180017609.5, 17 pages (W/ English Translation).
Sesia et al., "LTE—The UMTS Long Term Evolution: From Theory to Practice," John Wiley and Sons, Ltd., West Sussex, United Kingdom, 2009, pp. 135-140 and 181-206. (36 total pages).
Taiwanese Office Action dated Jan. 5, 2015, for Corresponding TW Application No. 100104303, 11 pages.
Japanese Office Action, dated Sep. 15, 2020, for Japanese Application No. 2019-204801, 3 pages. (with English machine translation).

* cited by examiner

| Flag Format 0/1A | Hopping Flag | Resource Block Assignment | MCS & RV | NDI | TPC for PUSCH | Cyclic Shift DMRS | CQI request | padding bits to Format 1A |
|---|---|---|---|---|---|---|---|---|
| = 0 | 0/1 | 5 to 13 bits | 5 bits | 0/1 | 2 bits | 3 bits | 0/1 | |

Fig. 9

| CIF field | Flag Format 0/1A | Hopping Flag | Resource Block Assignment | MCS & RV | NDI | TPC for PUSCH | Cyclic Shift DMRS | CQI request | padding bits to Format 1A |
|---|---|---|---|---|---|---|---|---|---|
| 3 bits | = 0 | 0/1 | 5 to 13 bits | 5 bits | 0/1 | 2 bits | 3 bits | 0/1 | |

Fig. 10

| CIF field | Flag Format 0/1A | Hopping Flag | Resource Block Assignment | MCS & RV | DL CC (de)activation field | Cyclic Shift DMRS | padding bits to Format 1A |
|---|---|---|---|---|---|---|---|
| = 111 | = 0 | 0/1 | 5 to 13 bits | 5 bits | 4 bits | 3 bits | |

Fig. 13

| CIF field | Flag Format 0/1A | Hopping Flag | Resource Block Assignment | MCS & RV | NDI | TPC for PUSCH | Cyclic Shift DMRS | CQI request | padding bits to Format 1A |
|---|---|---|---|---|---|---|---|---|---|
| ≠ 111 | = 0 | 0/1 | 5 to 13 bits | 5 bits | 0/1 | 2 bits | 3 bits | 0/1 | |

Fig. 14

| Flag Format 0/1A | Localized/Distributed VRB assignment flag | RBA | MCS | HARQ process number | NDI | RV | TPC for PUCCH |
|---|---|---|---|---|---|---|---|
| = 1 | 1 bit | 5 to 13 bits | 5 bits | 3 bits | 1 bit | 2 bits | 2 bits |

Fig. 17

| CIF | Flag Format 0/1A | Localized/Distributed VRB assignment flag | RBA | MCS | HARQ process number | NDI | RV | TPC for PUCCH |
|---|---|---|---|---|---|---|---|---|
| 3 bits | = 1 | 1 bit | 5 to 13 bits | 5 bits | 3 bits | 1 bit | 2 bits | 2 bits |

| Flag Format 0/1A | Localized/Distributed VRB assignment flag | RBA | MCS | HARQ process number | DL CC (de)activation flag | RV | TPC for PUCCH |
|---|---|---|---|---|---|---|---|
| = 1 | 1 bit | 5 to 13 bits | 5 bits | 3 bits | 1 bit | 2 bits | 2 bits |

Fig. 20

| Flag Format 0/1A | Localized/Distributed VRB assignment flag | RBA | MCS | HARQ process number | RV | DL CC (de)activation field |
|---|---|---|---|---|---|---|
| = 1 | 1 bit | 5 to 13 bits | 5 bits | 3 bits | 2 bits | 3 bits |

COMPONENT CARRIER ACTIVATION AND DEACTIVATION USING RESOURCE ASSIGNMENTS

BACKGROUND

Technical Field

This invention relates to the proposal of a new uplink resource assignment format and a new downlink resource assignment format that allow the activation/deactivation of individual downlink component carriers configured for a mobile terminal. Furthermore, the invention relates to the use of the new uplink/downlink resource assignments in methods for (de)activation of downlink component carrier(s) configured for a mobile terminal, a base station and a mobile terminal.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is to be finalized as Release 8 (LTE). The LTE system represents efficient packet-based radio access and radio access networks that provide full IP-based functionalities with low latency and low cost. The detailed system requirements are given in. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-Carrier Frequency Division Multiple Access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in LTE (Release 8).

LTE Architecture

The overall architecture is shown in FIG. 1 and a more detailed representation of the E-UTRAN architecture is given in FIG. 2. The E-UTRAN consists of eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g., parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE (Release 8)

The downlink component carrier of a 3GPP LTE (Release 8) is subdivided in the time-frequency domain in so-called sub-frames. In 3GPP LTE (Release 8) each sub-frame is divided into two downlink slots as shown in FIG. 3, wherein the first downlink slot comprises the control channel region (PDCCH region) within the first OFDM symbols. Each sub-frame consists of a give number of OFDM symbols in the time domain (12 or 14 OFDM symbols in 3GPP LTE (Release 8)), wherein each of OFDM symbol spans over the entire bandwidth of the component carrier. The OFDM symbols are thus each consists of a number of modulation symbols transmitted on respective $N_{RB}^{DL} \times N_{sc}^{RB}$ subcarriers as also shown in FIG. 4.

Assuming a multi-carrier communication system, e.g., employing OFDM, as for example used in 3GPP Long Term Evolution (LTE), the smallest unit of resources that can be assigned by the scheduler is one "resource block". A physical resource block is defined as $N_{symb}^{DL}$ consecutive OFDM symbols in the time domain and $N_{sc}^{RB}$ consecutive subcarriers in the frequency domain as exemplified in FIG. 4. In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", version 8.9.0 or 9.0.0, section 6.2, available at http://www.3gpp.org and incorporated herein by reference).

Layer 1/Layer 2 (L1/L2) Control Signaling

In order to inform the scheduled users about their allocation status, transport format and other data related information (e.g., HARQ information, transmit power control (TPC) commands), L1/L2 control signaling is transmitted on the downlink along with the data. L1/L2 control signaling is multiplexed with the downlink data in a sub-frame, assuming that the user allocation can change from sub-frame to sub-frame. It should be noted that user allocation might also be performed on a TTI (Transmission Time Interval) basis, where the TTI length is a multiple of the sub-frames. The TTI length may be fixed in a service area for all users, may be different for different users, or may even by dynamic for each user. Generally, the L1/2 control signaling needs only be transmitted once per TTI. The L1/L2 control signaling is transmitted on the Physical Downlink Control Channel (PDCCH). It should be noted that in 3GPP LTE, assignments for uplink data transmissions, also referred to as uplink scheduling grants or uplink resource assignments, are also transmitted on the PDCCH.

With respect to scheduling grants, the information sent on the L1/L2 control signaling may be separated into the following two categories.

Shared Control Information (SCI) Carrying Cat 1 Information

The shared control information part of the L1/L2 control signaling contains information related to the resource allocation (indication). The shared control information typically contains the following information:

A user identity indicating the user(s) that is/are allocated the resources.

RB allocation information for indicating the resources (Resource Blocks (RBs)) on which a user(s) is/are allocated. The number of allocated resource blocks can be dynamic.

The duration of assignment (optional), if an assignment over multiple sub-frames (or TTIs) is possible.

Depending on the setup of other channels and the setup of the Downlink Control Information (DCI)—see below—the shared control information may additionally contain information such as ACK/NACK for uplink transmission, uplink scheduling information, information on the DCI (resource, MCS, etc.).

Downlink Control Information (DCI) Carrying Cat 2/3 Information

The downlink control information part of the L1/L2 control signaling contains information related to the transmission format (Cat 2 information) of the data transmitted to a scheduled user indicated by the Cat 1 information. Moreover, in case of using (Hybrid) ARQ as a retransmission protocol, the Cat 2 information carries HARQ (Cat 3) information. The downlink control information needs only to be decoded by the user scheduled according to Cat 1. The downlink control information typically contains information on:

Cat 2 information: Modulation scheme, transport-block (payload) size or coding rate, MIMO (Multiple Input Multiple Output)-related information, etc. Either the transport-block (or payload size) or the code rate can be signaled. In any case these parameters can be calculated from each other by using the modulation scheme information and the resource information (number of allocated resource blocks)

Cat 3 information: HARQ related information, e.g., hybrid ARQ process number, redundancy version, retransmission sequence number Downlink control information occurs in several formats that differ in overall size and also in the information contained in its fields. The different DCI formats that are currently defined for LTE Release 8/9 (3GPP LTE) are described in detail in 3GPP TS 36.212, "Multiplexing and channel coding (Release 9)", version 8.8.0 or 9.0.0, section 5.3.3.1 (available at http://www.3gpp.org and incorporated herein by reference).

Downlink & Uplink Data Transmission

Regarding downlink data transmission, L1/L2 control signaling is transmitted on a separate physical channel (PDCCH), along with the downlink packet data transmission. This L1/L2 control signaling typically contains information on:

The physical resource(s) on which the data is transmitted (e.g., subcarriers or subcarrier blocks in case of OFDM, codes in case of CDMA). This information allows the UE (receiver) to identify the resources on which the data is transmitted.

When user equipment is configured to have a Carrier Indication Field (CIF) in the L1/L2 control signaling this information identifies the component carrier for which the specific control signaling information is intended. This enables assignments to be sent on one component carrier which are intended for another component carrier ("cross-carrier scheduling"). This other, cross-scheduled component carrier could be for example a PDCCH-less component carrier, i.e., the cross-scheduled component carrier does not carry any L1/L2 control signaling.

The Transport Format, which is used for the transmission. This can be the transport block size of the data (payload size, information bits size), the MCS (Modulation and Coding Scheme) level, the Spectral Efficiency, the code rate, etc. This information (usually together with the resource allocation (e.g., the number of resource blocks assigned to the user equipment)) allows the user equipment (receiver) to identify the information bit size, the modulation scheme and the code rate in order to start the demodulation, the de-rate-matching and the decoding process. The modulation scheme may be signaled explicitly.

Hybrid ARQ (HARQ) information:
HARQ process number: Allows the user equipment to identify the hybrid ARQ process on which the data is mapped.
Sequence number or new data indicator (NDI): Allows the user equipment to identify if the transmission is a new packet or a retransmitted packet.

If soft combining is implemented in the HARQ protocol, the sequence number or new data indicator together with the HARQ process number enables soft-combining of the transmissions for a PDU prior to decoding.

Redundancy and/or constellation version: Tells the user equipment, which hybrid ARQ redundancy version is used (required for de-rate-matching) and/or which modulation constellation version is used (required for demodulation).

UE Identity (UE ID): Tells for which user equipment the L1/L2 control signaling is intended for. In typical implementations this information is used to mask the CRC of the L1/L2 control signaling in order to prevent other user equipments to read this information.

To enable an uplink packet data transmission, L1/L2 control signaling is transmitted on the downlink (PDCCH) to tell the user equipment about the transmission details. This L1/L2 control signaling typically contains information on:

The physical resource(s) on which the user equipment should transmit the data (e.g., subcarriers or subcarrier blocks in case of OFDM, codes in case of CDMA).

When user equipment is configured to have a Carrier Indication Field (CIF) in the L1/L2 control signaling this information identifies the component carrier for which the specific control signaling information is intended. This enables assignments to be sent on one component carrier which are intended for another component carrier. This other, cross-scheduled component carrier may be for example a PDCCH-less component carrier, i.e., the cross-scheduled component carrier does not carry any L1/L2 control signaling.

L1/L2 control signaling for uplink grants is sent on the DL component carrier that is linked with the uplink component carrier or on one of the several DL component carriers, if several DL component carriers link to the same UL component carrier.

The Transport Format, the user equipment should use for the transmission. This can be the transport block size of the data (payload size, information bits size), the MCS (Modulation and Coding Scheme) level, the Spectral Efficiency, the code rate, etc. This information (usually together with the resource allocation (e.g., the number of resource blocks assigned to the user equipment)) allows the user equipment (transmitter) to pick the information bit size, the modulation scheme and the code rate in order to start the modulation, the rate-matching and the encoding process. In some cases the modulation scheme maybe signaled explicitly.

Hybrid ARQ information:

HARQ Process number: Tells the user equipment from which hybrid ARQ process it should pick the data.

Sequence number or new data indicator: Tells the user equipment to transmit a new packet or to retransmit a packet. If soft combining is implemented in the HARQ protocol, the sequence number or new data indicator together with the HARQ process number enables soft-combining of the transmissions for a protocol data unit (PDU) prior to decoding.

Redundancy and/or constellation version: Tells the user equipment, which hybrid ARQ redundancy version to use (required for rate-matching) and/or which modulation constellation version to use (required for modulation).

UE Identity (UE ID): Tells which user equipment should transmit data. In typical implementations this information is used to mask the CRC of the L1/L2 control signaling in order to prevent other user equipments to read this information.

There are several different flavors how to exactly transmit the information pieces mentioned above in uplink and downlink data transmission. Moreover, in uplink and downlink, the L1/L2 control information may also contain additional information or may omit some of the information. For example:

HARQ process number may not be needed, i.e., is not signaled, in case of a synchronous HARQ protocol.

A redundancy and/or constellation version may not be needed, and thus not signaled, if Chase Combining is used (always the same redundancy and/or constellation version) or if the sequence of redundancy and/or constellation versions is pre-defined.

Power control information may be additionally included in the control signaling.

MIMO related control information, such as, e.g., pre-coding, may be additionally included in the control signaling.

In case of multi-codeword MIMO transmission transport format and/or HARQ information for multiple code words may be included.

For uplink resource assignments (on the Physical Uplink Shared Channel (PUSCH)) signaled on PDCCH in LTE, the L1/L2 control information does not contain a HARQ process number, since a synchronous HARQ protocol is employed for LTE uplink. The HARQ process to be used for an uplink transmission is given by the timing. Furthermore it should be noted that the redundancy version (RV) information is jointly encoded with the transport format information, i.e., the RV info is embedded in the transport format (TF) field. The Transport Format (TF) respectively modulation and coding scheme (MCS) field has for example a size of 5 bits, which corresponds to 32 entries. Three TF/MCS table entries are reserved for indicating redundancy versions (RVs) 1, 2 or 3. The remaining MCS table entries are used to signal the MCS level (TBS) implicitly indicating RV0. The size of the CRC field of the PDCCH is 16 bits.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. Three of the entries are reserved to signal an explicit modulation order, providing no Transport format (Transport block) info. For the remaining 29 entries modulation order and Transport block size info are signaled.

Physical Downlink Control Channel (PDCCH)

The physical downlink control channel (PDCCH) carries the L1/L2 control signaling, i.e., transmit power control commands and the scheduling grants for allocating resources for downlink or uplink data transmission. To be more precise, the downlink control channel information (i.e., the DCI contents, respectively, the L1/L2 control signaling information) is mapped to its corresponding physical channel, the PDCCH. This "mapping" includes the determination of a CRC attachment for the downlink control channel information, which is a CRC calculated on the downlink control channel information being masked with an RNTI, as will explained below in more detail. The downlink control channel information and its CRC attachment are then transmitted on the PDCCH (see 3GPP TS 36.212, sections 4.2 and 5.3.3).

Each scheduling grant is defined based on Control Channel Elements (CCEs). Each CCE corresponds to a set of Resource Elements (REs). In 3GPP LTE, one CCE consists of 9 Resource Element Groups (REGs), where one REG consists of four REs.

The PDCCH is transmitted on the first one to three OFDM symbols within a sub-frame. For a downlink grant on the physical downlink shared channel (PDSCH), the PDCCH assigns a PDSCH resource for (user) data within the same sub-frame. The PDCCH control channel region within a sub-frame consists of a set of CCE where the total number of CCEs in the control region of sub-frame is distributed throughout time and frequency control resource. Multiple CCEs can be combined to effectively reduce the coding rate of the control channel. CCEs are combined in a predetermined manner using a tree structure to achieve different coding rate.

In 3GPP LTE (Release 8/9), a PDCCH can aggregate 1, 2, 4 or 8 CCEs. The number of CCEs available for control channel assignment is a function of several factors, including carrier bandwidth, number of transmit antennas, number of OFDM symbols used for control and the CCE size, etc. Multiple PDCCHs can be transmitted in a sub-frame.

Downlink control channel information in form of DCI transports downlink or uplink scheduling information, requests for aperiodic CQI reports, or uplink power control commands for one RNTI (Radio Network Terminal Identifier). The RNTI is a unique identifier commonly used in 3GPP systems like 3GPP LTE (Release 8/9) for destining data or information to a specific user equipment. The RNTI is implicitly included in the PDCCH by masking a CRC calculated on the DCI with the RNTI—the result of this operation is the CRC attachment mentioned above. On the user equipment side, if decoding of the payload size of data is successful, the user equipment detects the DCI to be destined to the user equipment by checking whether the CRC on the decoded payload data using the "unmasked" CRC (i.e., after removing the masking using the RNTI) is successful. The masking of the CRC code is for example performed by scrambling the CRC with the RNTI.

In 3GPP LTE (Release 8) the following different DCI formats are defined:

Uplink DCI formats:
  Format 0 used for transmission of UL SCH assignments
  Format 3 is used for transmission of TPC commands for PUCCH and PUSCH with 2 bit power adjustments (multiple UEs are addressed)
  Format 3A is used for transmission of TPC commands for PUCCH and PUSCH with single bit power adjustments (multiple UEs are addressed)

Downlink DCI formats:
  Format 1 used for transmission of DL SCH assignments for SIMO operation
  Format 1A used for compact transmission of DL SCH assignments for SIMO operation
  Format 1B used to support closed loop single rank transmission with possibly contiguous resource allocation
  Format 1C is for downlink transmission of paging, RACH response and dynamic BCCH scheduling
  Format 1D is used for compact scheduling of one PDSCH codeword with precoding and power offset information
  Format 2 is used for transmission of DL-SCH assignments for closed-loop MIMO operation
  Format 2A is used for transmission of DL-SCH assignments for open-loop MIMO operation For further information on the LTE physical channel structure in downlink and the PDSCH and PDCCH format, see Stefania Sesia et al., "LTE—The UMTS Long Term Evolution", Wiley & Sons Ltd., ISBN 978-0-47069716-0, April 2009, sections 6 and 9.

Blind Decoding of PDCCHs at the User Equipment

In 3GPP LTE (Release 8/9), the user equipment attempts to detect the DCI within the PDCCH using so-called "blind decoding". This means that there is no associated control signaling that would indicate the CCE aggregation size or modulation and coding scheme for the PDCCHs signaled in the downlink, but the user equipment tests for all possible combinations of CCE aggregation sizes and modulation and coding schemes, and confirms that successful decoding of a PDCCH based on the RNTI. To further limit complexity a common and dedicated search space in the control signaling region of the LTE component carrier is defined in which the user equipment searches for PDCCHs.

In 3GPP LTE (Release 8/9) the PDCCH payload size is detected in one blind decoding attempt. The user equipment attempts to decode two different payload sizes for any configured transmission mode, as highlighted in Table 1 below. Table 1 shows that payload size X of DCI formats 0, 1A, 3, and 3A is identical irrespective of the transmission mode configuration. The payload size of the other DCI format depends on the transmission mode.

TABLE 1

DCI Formats

| payload size X | payload size different from X | | transmission mode |
|---|---|---|---|
| 0/1A/3/3A | 1C | | broadcast/unicast/paging/power control |
| | 1 | Mode 1 | DL TX modes |
| | 1 | Mode 2 | |
| | 2A | Mode 3 | |
| | 2 | Mode 4 | |
| | 1B | Mode 5 | |
| | 1D | Mode 6 | |
| | 1 | Mode 7 | |
| | 1 | Mode 1 | SPS-Modes |
| | 1 | Mode 2 | |
| | 2A | Mode 3 | |
| | 2 | Mode 4 | |
| | 1 | Mode 7 | |

Accordingly, the user equipment can check in a first blind decoding attempt the payload size of the DCI. Furthermore, the user equipment is further configured to only search for a given subset of the DCI formats in order to avoid too high processing demands.

Further Advancements for LTE (LTE-A)

The frequency spectrum for IMT-Advanced was decided at the World Radiocommunication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved in the 3GPP. The study item covers technology components to be considered for the evolution of E-UTRA, e.g., to fulfill the requirements on IMT-Advanced. Two major technology components which are currently under consideration for LTE-A are described in the following.

Carrier Aggregation in LTE-A for Support of Wider Bandwidth

In Carrier Aggregation (CA), two or more Component Carriers (CCs) are aggregated in order to support wider transmission bandwidths up to 100 MHz. All component carriers can be configured to be 3GPP LTE (Release 8/9) compatible, at least when the aggregated numbers of component carriers in the uplink and the downlink are the same. This does not necessarily mean that all component carriers need to be compatible to 3GPP LTE (Release 8/9).

A user equipment may simultaneously receive or transmit on one or multiple component carriers. On how many component carriers simultaneous reception/transmission is possible, is depending on the capabilities of a user equipment.

A 3GPP LTE (Release 8/9) compatible user equipment can receive and transmit on a single CC only, provided that the structure of the CC follows the 3GPP LTE (Release 8/9) specifications, while a 3GPP LTE-A (Release 10) compatible user equipment with reception and/or transmission capabilities for carrier aggregation can simultaneously receive and/or transmit on multiple component carriers.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. In a typical TDD deployment, the number of component carriers and the bandwidth of each component carrier in uplink and downlink is the same. Component carriers originating from the same eNodeB need not to provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively.

When carrier aggregation is configured, the user equipment only has one Radio Resource Control (RRC) connection with the network. One cell—the "special cell"-provides the security input and the Non-Access Stratum (NAS) mobility information (e.g., TAI). There is only one special cell per user equipment in connected mode.

After RRC connection establishment to the special cell, the reconfiguration, addition and removal of component carriers can be performed by RRC. At intra-LTE handover, RRC can also add, remove, or reconfigure component carriers for usage in the target cell. When adding a new component carrier, dedicated RRC signaling is used for sending component carriers' system information which is necessary for component carrier transmission/reception, similar to a handover in 3GPP LTE (Release 8/9).

When a user equipment is configured with carrier aggregation there is one pair of uplink and downlink component carriers that is always activate. The downlink component carrier of that pair might be also referred to as 'DL anchor carrier'. Same applies also for the uplink.

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats.

A linking between uplink and downlink component carriers allows identifying the uplink component carrier for which the grant applies when there is no-cross-carrier scheduling.

The linkage of downlink component carriers to uplink component carriers does not necessarily need to be one to one. In other words, more than one downlink component carrier can link to the same uplink component carrier. At the same time, a downlink component carrier can only link to one uplink component carrier. FIG. 7 exemplarily shows possible linkages between downlink and uplink component carriers. While on the left side all downlink component carriers are linked to the same uplink component carrier, on the right side downlink component carriers 1 and 2 are linked to uplink component carrier 1 and downlink component carrier 3 is linked to uplink component carrier 2.

DRX and Carrier Aggregation

In order to provide reasonable battery consumption of user equipment 3GPP LTE (Release 8/9) as well as 3GPP LTE-A (Release 10) provides a concept of discontinuous reception (DRX).

For this concept the following terms describe the user equipment's state in terms of DRX.

- on-duration: duration in downlink sub-frames that the user equipment waits for, after waking up from DRX, to receive PDCCHs. If the user equipment successfully decodes a PDCCH, the user equipment stays awake and starts the inactivity timer;
- inactivity-timer: duration in downlink sub-frames that the user equipment waits to successfully decode a PDCCH, from the last successful decoding of a PDCCH, failing which it re-enters DRX. The user equipment shall restart the inactivity timer following a single successful decoding of a PDCCH for a first transmission only (i.e., not for retransmissions).
- active-time: total duration that the user equipment is awake. This includes the "on-duration" of the DRX cycle, the time user equipment is performing continuous reception while the inactivity timer has not expired and the time user equipment is performing continuous reception while waiting for a downlink retransmission after one HARQ RTT (Round Trip Time). Based on the above the minimum active time is of length equal to on-duration, and the maximum is undefined (infinite);

There is only one DRX cycle per user equipment. All aggregated component carriers follow this DRX pattern.

In order to allow for further battery saving optimization, a further step of activation/deactivation of component carriers is introduced. Essentially a downlink component carrier could be in one of the following three states: non-configured, configured but deactivated and active. When a downlink component carrier is configured but deactivated, the user equipment does not need to receive the corresponding PDCCH or PDSCH, nor is it required to perform CQI measurements. Conversely, when a downlink component carrier is active, the user equipment shall receive PDSCH and PDCCH (if present), and is expected to be able to perform CQI measurements. After configuration of component carriers in order to have PDCCH and PDSCH reception on a downlink component as described above, the downlink component carrier needs to be transitioned from configured but deactivated to active state.

In the uplink however, a user equipment is always required to be able to transmit on PUSCH on any configured uplink component carrier when scheduled on the corresponding PDCCH (i.e., there is no explicit activation of uplink component carriers).

For user equipment power-saving purposes, it is crucial that additional component carriers can be de-activated and activated in an efficient and fast way. With bursty data-transmission, it is imperative that additional component carriers can be activated and de-activated quickly, such that both the gains of high bit-rates can be utilized, and battery preservation can be supported. As described before user equipments will not perform and report CQI measurements on configured but deactivated downlink component carriers but only radio resource management related measurements like RSRP (Reference Signal Received Power) and RSRQ (Reference Signal Received Quality) measurements. Hence when activating a downlink component carrier, it is important that eNodeB acquires quickly CQI information for the newly activated component carrier(s) in order to being able to select an appropriate MCS for efficient downlink scheduling. Without CQI information eNodeB does not have knowledge about user equipment's downlink channel state and might only select a rather conservative MCS for downlink data transmission which would in turn lead to some resource utilization inefficiency.

In order to acquire CQI information quickly, eNodeB can schedule an aperiodic CQI by means of an uplink scheduling grant. The aperiodic CQI would be transmitted on the physical uplink shared channel (PUSCH). Therefore in order to activate a configured downlink component carrier, eNodeB would need to issue essentially two grants (PDCCH) to the UE, one downlink PDCCH in order to indicate the activation of a downlink component carrier and one uplink PDCCH which schedules uplink resources for the transmission of the aperiodic CQI. Furthermore both PDCCH has to be sent respectively received in the same TTI in order to ensure, that user equipment measures and reports CQI information for the correct downlink component carrier, i.e., the downlink component carrier which will be activated.

The correct reception of the aperiodic CQI can serve as an acknowledgement for the downlink activation command, i.e., when aperiodic CQI has been received eNodeB assumes that user equipment has activated the downlink component carrier indicated in the downlink PDCCH.

As it becomes apparent, the main drawback of the above described component carrier activation method is, that two PDCCHs are required in order to activate a downlink component carrier. Furthermore due to the fact that the two PDCCHs need to be received/sent simultaneously, certain error cases may occur in the presence of PDCCH loss.

In case only the downlink "activation" PDCCH is lost, user equipment will not activate the downlink component carrier. However based on received CQI information eNB erroneously assumes downlink activation has succeeded.

In the second error case when only the uplink PDCCH which requests the aperiodic CQI is lost, eNodeB does not acquire CQI and erroneously assumes that downlink activation has failed.

BRIEF SUMMARY

One object of the invention is to overcome at least one of the described problems. Furthermore, it is another object of the invention to enable efficient and robust (de)activation of component carriers, while minimizing the signaling overhead.

The object is solved by the subject matter of the independent claims. Advantageous embodiments of the invention are subject to the dependent claims.

A first aspect of the invention is the proposal of a new uplink resource assignment format and a new downlink resource assignment format that allow the activation/deactivation of individual downlink component carriers configured for a mobile terminal (referred to as user equipment in the 3GPP terminology). The new uplink or downlink resource assignment comprises an indication of the activation state of the configured downlink component carriers, i.e., indicate which downlink component carrier(s) is/are to be activated or deactivated. This indication is for example implemented by means of a bit-mask that indicates which of the configured uplink component carriers are to be activated respectively deactivated.

Furthermore, as to the proposal of the new downlink resource assignment format, a single downlink resource assignment can be used to (de)activate downlink component carrier(s) and to simultaneously assign downlink resources on an activated downlink component carrier (i.e., a downlink component carrier already in active state at the time of receiving the downlink resource assignment).

In one exemplary implementation of the format in a 3GPP based communication system using carrier aggregation in the downlink, such as 3GPP LTE-A (Release 10) or future releases using carrier aggregation in the downlink, the new resource assignment format may be considered an extension to existing DCI formats or a new DCI format.

In another exemplary implementation, each of the bits in the bit-mask is associated to a respective configured downlink component carrier, and indicates its activation state. By checking this bit-mask comprised in the uplink or downlink resource assignment, the mobile terminal can determine for each of the configured downlink component carriers, whether the activation state of the respective downlink component carrier is changed, i.e., which one or ones of the configured downlink component carriers need to be activated or deactivated.

Furthermore, in a more advanced exemplary implementation, the uplink resource assignment including the component carrier activation/deactivation information may also instruct the mobile terminal to send a channel quality measurement on the newly activated component carriers (i.e., those component carrier(s) for which the state has changed from deactivated to activated). Accordingly, the mobile terminal performs a channel quality measurement for each newly activated component carrier and sends the result of the measurement to the base station (referred to as eNodeB in the 3GPP terminology) on the uplink resources that have been assigned to the mobile terminal by means of the uplink resource assignment. The transmission of the channel quality measurement result(s) indicates to the base station that the mobile terminal has successfully received the uplink resource assignment, respectively, has successfully activated/deactivated the configured downlink component carriers. Hence, the transmission of the channel quality measurement result(s) can be considered an acknowledgment of the uplink resource assignment, respectively the activation/deactivation of configured downlink component carriers by the mobile terminal.

In one embodiment of the invention, the new format of the uplink resource assignment is used in a method for (de) activating downlink component carriers in a mobile communication system using component carrier aggregation. In this method performed by a mobile terminal, the mobile terminal receives on a downlink component carrier, an uplink resource assignment for assigning uplink resources to the mobile terminal. The uplink resource assignment comprises a bit-mask indicating which of plural configured downlink component carriers are to be activated, respectively deactivated. The mobile terminal activates or deactivates the configured downlink component carriers according to the bit-mask comprised in the uplink resource assignment.

In a further embodiment of the invention, the mobile terminal performs a channel quality measurement for each downlink component carrier newly activated by the uplink resource assignment (i.e., the downlink component carrier(s) that is/are not yet activated at the time of receiving the uplink resource assignment), and transmits the channel quality measurement(s) for the activated downlink component carrier(s) on assigned uplink resources. Alternatively, according to another embodiment of the invention, the mobile terminal may also transmit scheduling-related information for uplink scheduling on the assigned uplink resources.

In both cases, the uplink transmission on the assigned uplink resource may be considered and acknowledgement of the (successful) reception of the uplink resource assignment or successful (de)activation of the downlink component carriers.

In another exemplary embodiment, the new uplink resource assignment format is used in another method for (de)activating downlink component carriers in a mobile communication system using component carrier aggregation that is performed by a base station, the base station transmits an uplink resource assignment to a mobile terminal for assigning uplink resources to a mobile terminal. The uplink resource assignment is transmitted on an active configured downlink component carrier to the mobile terminal. Moreover, besides the uplink assignment to the mobile terminal, the uplink resource assignment comprises a bit-mask indicating which of plural configured downlink component carriers are to be activated, respectively deactivated. In response to his uplink resource assignment, the base station receives an acknowledgment for the successful reception of the uplink resource assignment or successful (de)activation of the downlink component carriers. The acknowledgment is transmitted on the assigned uplink resources. Furthermore, the acknowledgement is for example received in form of a channel quality measurement(s) for newly activated downlink component carrier(s) or alternatively in form of scheduling related information transmitted from the mobile terminal to the base station.

In another embodiment of the invention, the new format of the downlink resource assignment is used in a method for (de)activating downlink component carriers in a mobile communication system using component carrier aggregation. In this method performed by a mobile terminal, the mobile terminal receives on a downlink component carrier, a downlink resource assignment for assigning downlink resources to the mobile terminal. The downlink resource assignment comprises an indication that indicating which of plural configured downlink component carriers are to be activated, respectively deactivated. The mobile terminal activates or deactivates the configured downlink component carriers according to the indication comprised in the uplink resource assignment. The indication may be for example realized in form of a bit-mask.

Furthermore, the mobile terminal further receives the downlink data indicated in the downlink resource assignment. Please note that the assigned downlink resources are on a downlink component carrier already in active state at the time of receiving the downlink resource assignment— which could be the downlink component carrier on which the downlink resource assignment has been received or a cross-scheduled other downlink component carrier in active state.

Moreover, in a further exemplary embodiment of the invention, the downlink resource assignment and the downlink data on the assigned downlink resources are received within a single sub-frame.

In the methods described above, according to another embodiment of the invention, the uplink resource assignment comprises a CRC field that is masked with a radio network temporary identifier (RNTI) assigned to the mobile terminal for the activation and deactivation of downlink component carriers. The use of a "special" RNTI assigned to the mobile terminal for the activation and deactivation of downlink component carriers the base station may for example indicate the format of the received uplink resource assignment to the mobile terminal. The special RNTI for the activation and deactivation of downlink component carriers is advantageously mobile terminal specific, so that no further indication of the intended receiver of the uplink or downlink resource assignment is needed.

As mentioned above, in the context of implementing the concepts of this invention in a 3GPP based communication system using carrier aggregation in the downlink, the uplink resource assignment as well as the downlink resource assignment proposed herein can be considered a "special" DCI format of L1/L2 control information. As plural DCI formats may exist that have the same size, the RNTI assigned to the mobile terminal for the activation and deactivation of downlink component carriers may be a format indication to distinguish the combined uplink assignment including information on the downlink component carrier activation state from "pure" resource assignments on an uplink, respectively downlink component carrier.

Staying for exemplary purposes at the exemplary implementation of the concepts of the invention in the 3GPP context, the uplink resource assignment could be for example reusing the 3GPP LTE (Release 8/9) DCI format 0, wherein the bits of new data indicator (NDI), the TPC command field and the CQI request flag of 3GPP LTE DCI format 0 are reused to indicate the bit-mask. Alternatively, in another exemplary implementation and in order to further include and an indication whether the mobile terminal is to send channel quality measurement for the newly activated downlink component carrier(s) to the uplink resource assignment, the bits of new data indicator (NDI), the TPC command field, the CQI request flag and one bit of the modulation and coding scheme field of 3GPP LTE DCI format 0 may be reused to indicate the bit-mask and the indication whether the mobile terminal is to send channel quality measurement for the newly activated downlink component carrier(s).

In a further embodiment of the invention, and still in the context of implementing the concepts of the invention in a 3GPP based communication system using carrier aggregation in the downlink, the uplink resource assignment is considered downlink control information (DCI) for FDD operation and consists of.
- a format flag for distinguishing DCI formats, which are defined to have the same number of bits/size,
- a hopping flag indicating whether or not the mobile terminal should employ uplink resource hopping,
- a resource block assignment field assigning the uplink resources on the PUSCH to the mobile terminal,
- a modulation and coding scheme field that is indicating the modulation scheme, coding rate and the redundancy version for the transmission on the assigned resources on the PUSCH,
- a DMRS field for configuring the cyclic shift applied to the reference symbol sequence,
- a component carrier (de)activation field that is indicating for each of a plurality of downlink component carriers, whether the respective downlink component carrier is to be activated or deactivated by means of the bit-mask, and
- if required (i.e., optionally) one or more padding bit(s) to align the size of the dedicated control information to a predetermined number of bits.

In another alternative embodiment of the invention, the uplink resource assignment further—i.e., in addition to the fields mentioned above—consists of a carrier indicator field for indicating on which of plural uplink component carriers the uplink resources are assigned. This implementation may be useful in a 3GPP LTE-A (Release 10) where cross-carrier scheduling can be employed.

In both exemplary uplink assignment formats discussed in the preceding paragraphs, the uplink resource assignment may optionally further consists of a CQI flag for indicating whether the mobile terminal is to send channel quality measurement for the newly activated downlink component carrier(s). Please note that this CQI flag is not necessarily the CQI flag as known from the 3GPP LTE (Release 8/9) DCI format 0. In an alternative implementation, the two uplink resource assignment formats discussed in the preceding paragraphs may optionally make use of at least one codepoint representable in the modulation and coding scheme field to indicate whether the mobile terminal is to send channel quality measurement for the newly activated downlink component carrier(s).

In another exemplary embodiment related to the implementation of the proposed downlink assignment in the 3GPP context, the downlink resource assignment could be for example reusing the 3GPP LTE (Release 8/9) DCI format 1A. For example, the bit(s) of new data indicator (NDI) and/or the TPC command for PUCCH field of 3GPP LTE DCI format 1A may be reused to indicate the activation state of the downlink component carriers. For example, if redefining the NDI flag as a new downlink component carrier (DL CC) (de)activation flag, this new flag could be used to activate or deactivate all downlink component carriers (except for one of the downlink component carriers, e.g., the anchor carrier, that is always activated). If the TPC command for PUCCH field and the NDI flag are reused, it would be possible to indicate by using one bit the activation state (active or configured but deactivated) for one component carrier, and to use the remaining available bits for indicating the one downlink component carrier to which the (de)activation pertains.

In a further embodiment of the invention, the uplink, respectively downlink resource assignment comprises a CRC field that is masked with a radio network temporary identifier (RNTI) assigned to the mobile terminal for resource assignments to the mobile terminal, and at least one of the codepoints of a carrier indicator field (CIF) of the uplink, respectively downlink resource assignment is indicating whether the uplink, respectively downlink resource assignment is indicating the bit-mask for (de)activating the configured downlink component carriers, or whether the uplink resource assignment is not used for (de)activation of the configured downlink component carriers, respectively only assigns uplink, respectively downlink resources.

A further aspect of the invention is the implementation of the different methods for (de)activating downlink component carriers in a mobile communication system using component carrier aggregation according to the various embodiments discussed herein in hardware and software, or combinations thereof. In this context, another embodiment of the invention provides a mobile terminal for use in a mobile communication system using component carrier aggregation. The mobile terminal comprises a receiver for receiving on a downlink component carrier, an uplink resource assignment for assigning uplink resources to the mobile terminal, wherein the uplink resource assignment is comprising a bit-mask indicating which of plural configured downlink component carriers are to be activated, respectively deactivated. Furthermore, the mobile terminal comprises a processor for activating or deactivating the configured downlink component carriers according to the bit-mask comprised in the uplink resource assignment.

In a furthermore embodiment of the invention, the mobile terminal also comprises a channel quality measuring unit for performing a channel quality measurement for each downlink component carrier newly activated by the uplink resource assignment, and a transmitter for transmitting the channel quality measurement(s) for the activated downlink component carrier(s) on assigned uplink resources.

Another embodiment of the invention provides a further mobile terminal for use in a mobile communication system using component carrier aggregation. The mobile terminal comprises a receiver for receiving on a downlink component carrier, an downlink resource assignment for assigning downlink resources to the mobile terminal, wherein the uplink resource assignment is comprising a bit-mask indicating which of plural configured downlink component carriers are to be activated, respectively deactivated. The receiver of the mobile terminal further receives the downlink data on the downlink resources assigned by the downlink resource assignment. Furthermore, the mobile terminal comprises a processor for activating or deactivating the configured downlink component carriers according to the bit-mask comprised in the uplink resource assignment.

In another embodiment of the invention, the mobile terminal receives the downlink data using one of plural HARQ processes of a HARQ protocol, and assumes a known value for the new data indicator (NDI) for the transmission of the downlink data.

According to another embodiment of the invention the uplink, respectively downlink resource assignment is received within a control signaling region of a sub-frame. Accordingly, the mobile terminal (or more accurately its receiver) may perform a blind detection of the resource assignment within the control signaling region of the sub-frame.

In a further embodiment of the invention, the mobile terminal's processor further obtains a masked CRC code from a CRC field of the uplink, respectively downlink resource assignment, de-masks the masked CRC code with a radio network temporary identifier (RNTI) assigned to the mobile terminal for the activation and deactivation of downlink component carriers to thereby obtain a CRC code, and verifies successful blind detection of the resource assignment based on the CRC code.

Furthermore, another embodiment of the invention provides a base station for in a mobile communication system using component carrier aggregation. The base station comprises a transmitter for transmitting on an active configured downlink component carrier an uplink resource assignment to a mobile terminal for assigning uplink resources to a mobile terminal, wherein the uplink resource assignment is comprising a bit-mask indicating which of plural configured downlink component carriers are to be activated, respectively deactivated. Moreover, the base station comprises a receiver for receiving on the assigned uplink resources an acknowledgment for the successful reception of the uplink resource assignment or successful (de)activation of the downlink component carriers, wherein the acknowledgement is received in form of a channel quality measurement(s) for the newly activated downlink component carrier(s).

With respect to the assignment of downlink resources, a further embodiment of the invention provides a base station for in a mobile communication system using component carrier aggregation. The base station comprises a transmitter for transmitting on an active configured downlink component carrier a downlink resource assignment to a mobile terminal for assigning downlink resources to a mobile terminal, wherein the downlink resource assignment is comprising a bit-mask indicating which of plural configured downlink component carriers are to be activated, respectively deactivated. Moreover, the base station further transmits within the same sub-frame as the downlink resource assignment and on the assigned downlink resources downlink data (e.g., a transport block) to the mobile terminal.

In another embodiment of the invention, the base station uses one of plural HARQ processes of a HARQ protocol for the transmission of the downlink data, and assumes a known value for the new data indicator (NDI) for the transmission of the downlink data.

The base station according to a more specific embodiment of the invention further comprises a processor for generating a CRC field for the uplink, respectively downlink resource assignment and for masking the CRC field with a radio network temporary identifier (RNTI) assigned to the mobile terminal for the activation and deactivation of downlink component carriers prior to the transmission of the uplink, respectively downlink resource assignment to the mobile terminal.

Moreover, the base station's transmitter may transmit the radio network temporary identifier (RNTI) assigned to the mobile terminal for the activation and deactivation of downlink component carriers to the mobile terminal.

As mentioned above, an aspect of the invention is the implementation of the methods for (de)activating downlink component carriers in a mobile communication system using component carrier aggregation according to the various embodiments discussed herein in software and its storage on computer-readable storage media.

According to a further embodiment, the invention provides a computer-readable medium that stores instructions that, when executed by a processor of a mobile terminal, cause the mobile terminal to perform one of methods for (de)activating downlink component carriers in a mobile communication system using component carrier aggregation according to one of the various embodiments discussed herein. The execution of the instructions may for example cause the mobile terminal to receive on a downlink component carrier, an resource assignment for assigning uplink or downlink resources to the mobile terminal, wherein the resource assignment is indicating which of plural configured downlink component carriers are to be activated, respectively deactivated, and further to activate or deactivate the configured downlink component carriers according to the bit-mask comprised in the uplink resource assignment.

Another embodiment of the invention is providing a computer-readable medium that stores instructions that, when executed by a processor of base station, cause the base station to perform one of methods for (de)activating downlink component carriers in a mobile communication system using component carrier aggregation according to one of the various embodiments discussed herein. The execution of the instructions may for example cause the base station to transmit on an active configured downlink component carrier an uplink resource assignment to a mobile terminal for assigning uplink resources to a mobile terminal, wherein the uplink resource assignment is comprising a bit-mask indicating which of plural configured downlink component carriers are to be activated, respectively deactivated, and to receive on the assigned uplink resources an acknowledgment for the successful reception of the uplink resource assignment or successful (de)activation of the downlink component carriers, wherein the acknowledgement is received in form of a channel quality measurement(s) for newly activated downlink component carrier(s).

A further embodiment of the invention is providing a computer-readable medium that stores instructions that, when executed by a processor of base station, cause the base station to transmit on an active configured downlink component carrier a downlink resource assignment to a mobile terminal for assigning downlink resources to the mobile terminal, wherein the uplink resource assignment is indicating which of plural configured downlink component carriers are to be activated, respectively deactivated. The instructions further cause the base station to transmit downlink data to the mobile terminal on the assigned downlink resources and within the same sub-frame in which the downlink resource assignment is transmitted.

BRIEF DESCRIPTION OF THE SEVERAL VIEWS OF THE FIGURES

In the following the invention is described in more detail in reference to the attached figures and drawings. Similar or corresponding details in the figures are marked with the same reference numerals.

FIGS. 9 & 10 shows the contents of DCI format 0 in 3GPP LTE (Release 8/9), respectively 3GPP LTE-A (Release 10) without and with CIF field for cross-carrier scheduling, respectively, FIGS. 13 & 14 show a further exemplary improved DCI format 0 for (de)activating configured downlink component carriers for use in 3GPP LTE-A (Release 10) and according to an exemplary embodiment of the invention, where the interpretation of the content of the DCI format is depending on the codepoint of the CIF field, FIG. 15 exemplifies the procedure for the (de)activation of downlink component carriers in an exemplary 3GPP-based communication system according to an embodiment of the invention, FIG. 16 exemplifies another procedure for the (de)activation of downlink component carriers in an exemplary 3GPP-based communication system according to an embodiment of the invention, including PHR reporting and SRS signal activation, FIGS. 17 & 18 show the contents of DCI format 1 in 3GPP LTE (Release 8/9), respectively 3GPP LTE-A (Release 10) without and with CIF field for cross-carrier scheduling, respectively, FIG. 19 shows an exemplary improved DCI format 1 for (de)activating configured downlink component carriers for use in 3GPP LTE-A (Release 10) and according to an exemplary embodiment of the invention, and FIG. 20 shows another exemplary improved DCI format 1 for (de)activating configured downlink component carriers for use in 3GPP LTE-A (Release 10) and according to an exemplary embodiment of the invention.

DETAILED DESCRIPTION

Figure 1:
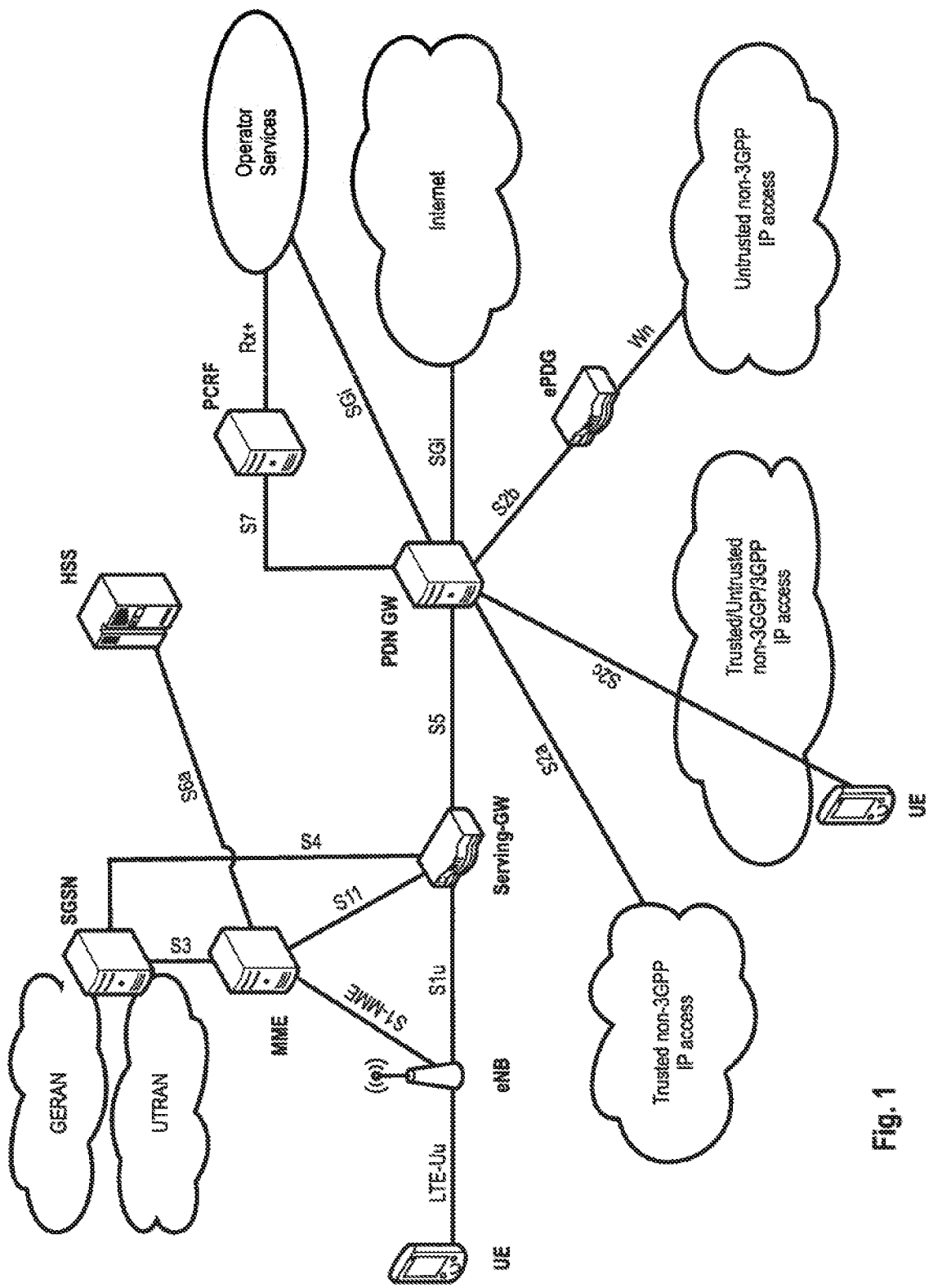
FIG. 1 shows an exemplary architecture of a 3GPP LTE system.
Figure 2:
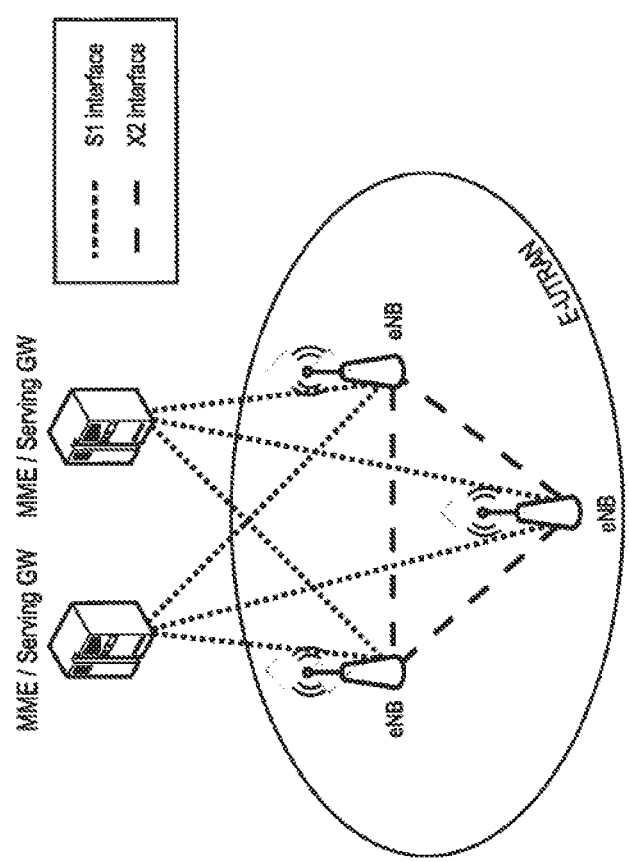
FIG. 2 shows an exemplary overview of the overall E-UTRAN architecture of 3GPP LTE.
Figure 3:
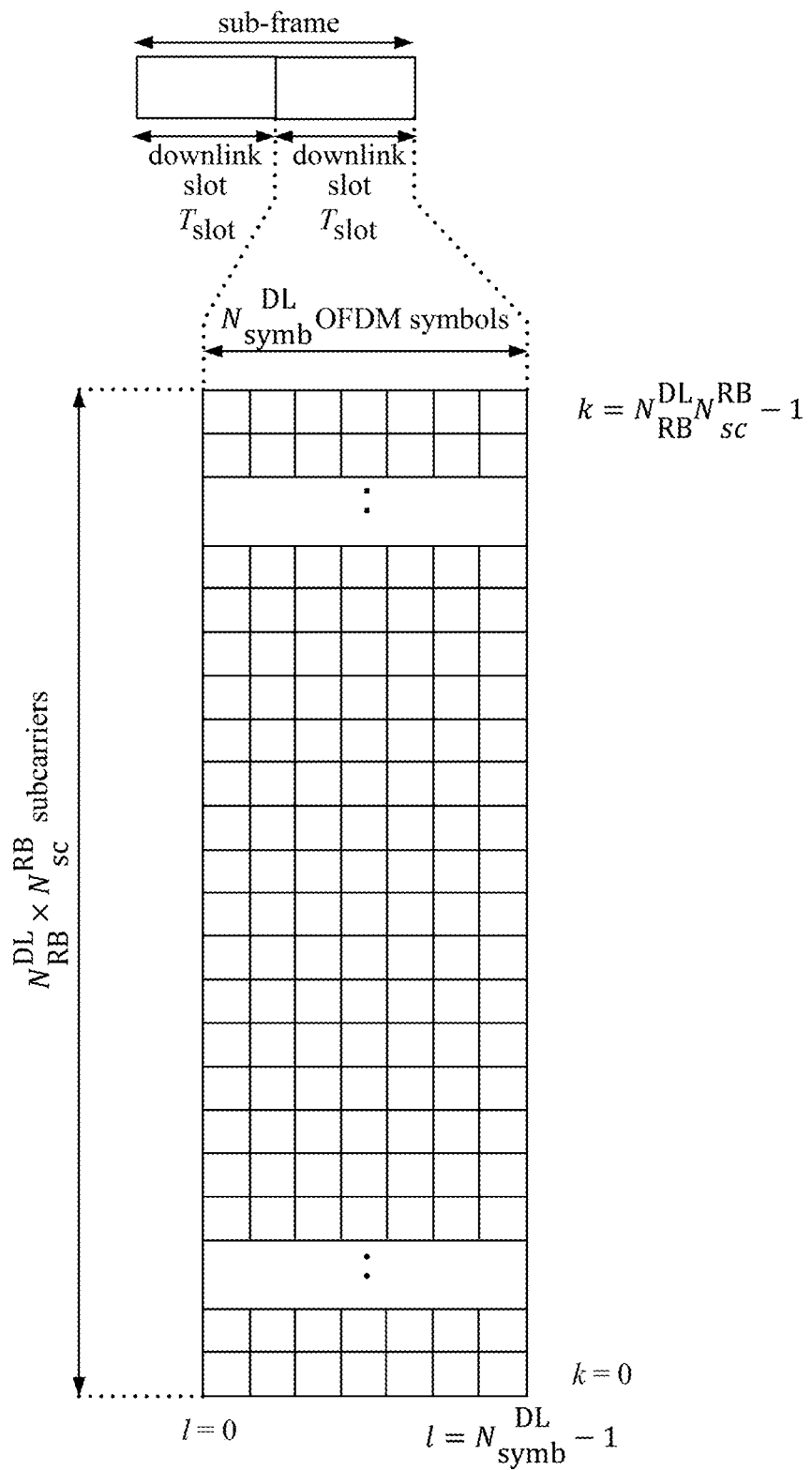
FIG. 3 shows an exemplary sub-frame structure on a downlink component carrier as defined for 3GPP LTE (Release 8/9)
Figure 4:
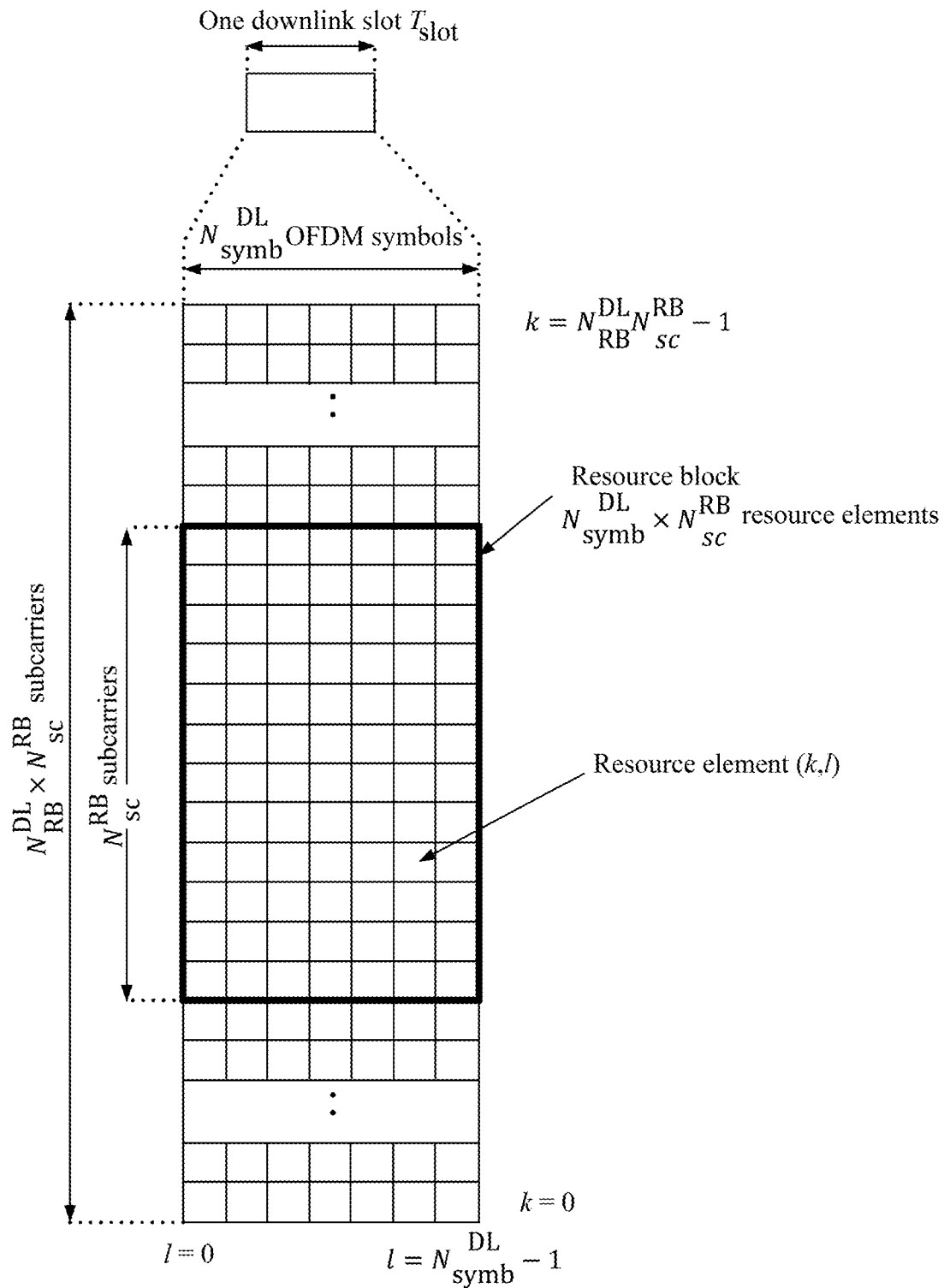
FIG. 4 shows an exemplary downlink resource grid of a downlink slot as defined for 3GPP LTE (Release 8/9)
Figure 5:
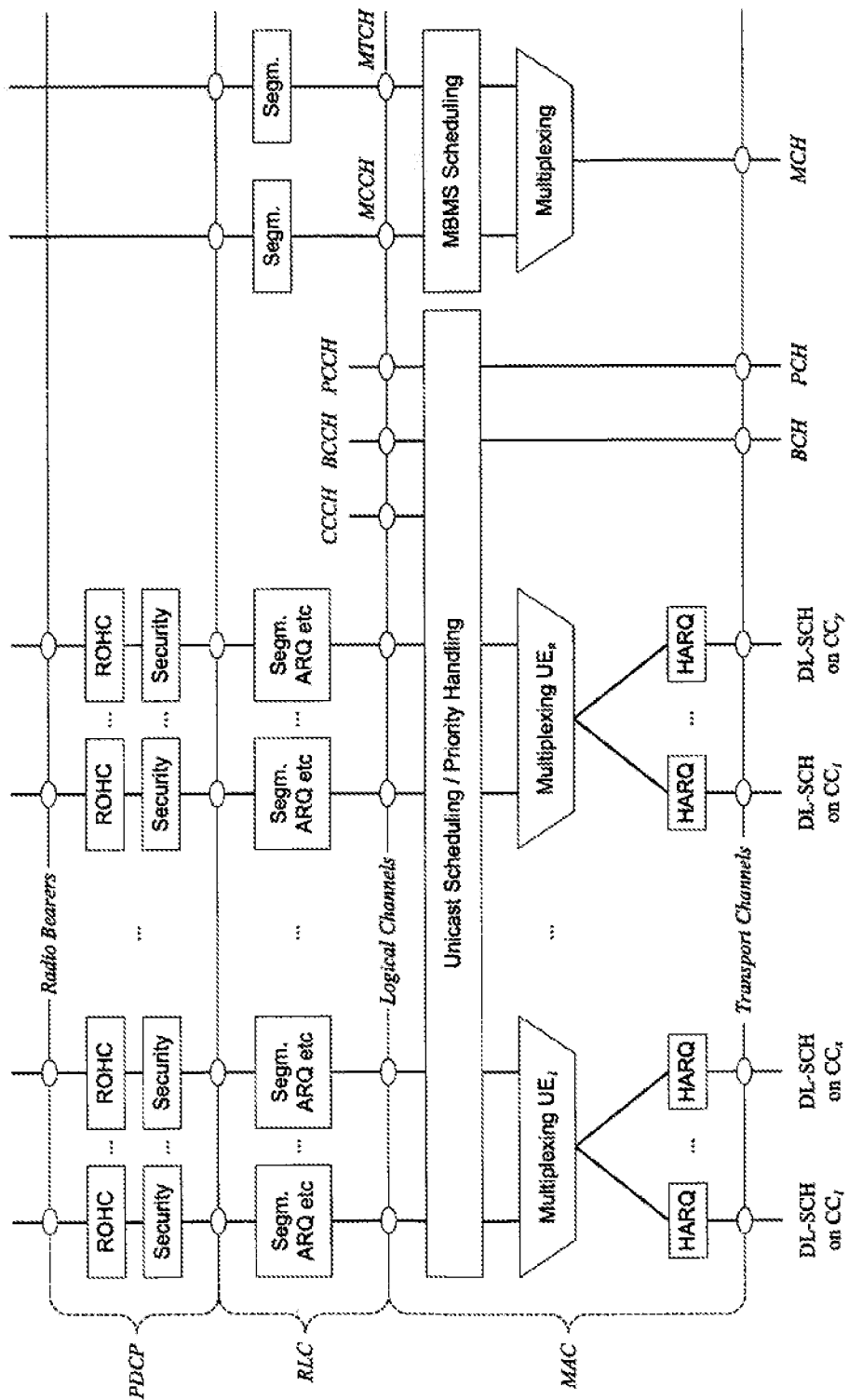
FIGS. 5 & 6 show the 3GPP LTE-A (Release 10) Layer 2 structure with activated carrier aggregation for the downlink and uplink, respectively.
Figure 6:
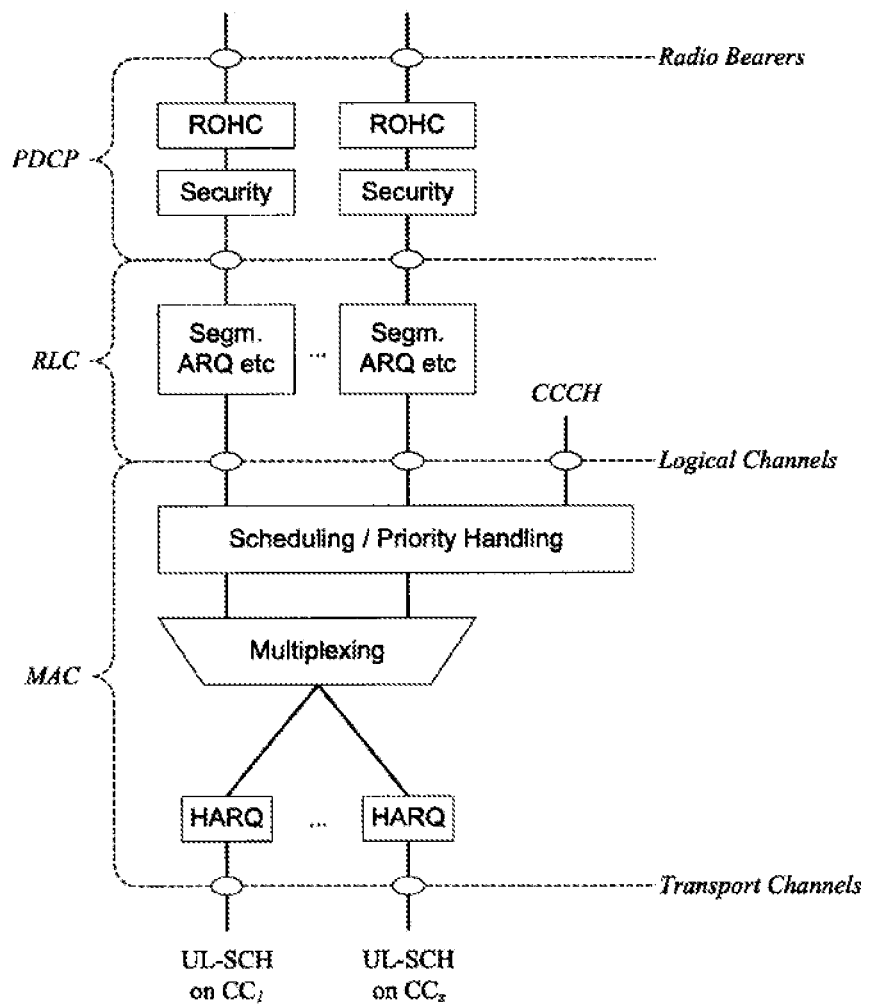
Figure 7:
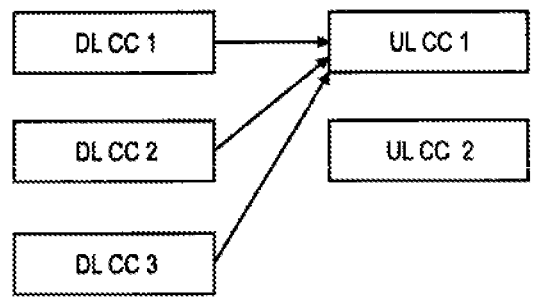
FIGS. 7 & 8 show exemplarily linkages between downlink and uplink component carriers in 3GPP LTE-A (Release 10)

The following paragraphs will describe various embodiments of the invention. For exemplary purposes only, most of the embodiments are outlined in relation to an orthogonal single-carrier uplink radio access scheme according to 3GPP LTE (Release 8) and LTE-A (Release 10) mobile communication systems discussed in the Technical Background section above. It should be noted that the invention may be advantageously used for example in connection with a mobile communication system such as 3GPP LTE (Release 8) and LTE-A (Release 10) communication systems previously described, but the invention is not limited to its use in this particular exemplary communication network.

The explanations given in the Technical Background section above are intended to better understand the mostly 3GPP LTE (Release 8) and LTE-A (Release 10) specific exemplary embodiments described herein and should not be understood as limiting the invention to the described specific implementations of processes and functions in the mobile communication network.

As described above, one major drawback of the prior art as known from a 3GPP LTE-A (Release 10) system is the necessity to send two PDCCHs in order to activate a downlink component carrier. The problem in this prior art solution is that a single downlink PDCCH indicating the activation of a downlink component carrier cannot simultaneously allocate PDSCH resources. Since PDCCH and PDSCH are transmitted in the same sub-frame in 3GPP LTE, i.e., PDCCH is transmitted for example within the first three OFDM symbols of a sub-frame, and the user equipment is not aware when a downlink component carrier is activated it cannot receive downlink data on the PDSCH within the same sub-frame on the newly activated downlink component carrier, when an activation PDCCH for this downlink component carrier is signaled.

The present invention provides a method where a single uplink or downlink resource assignment is used in order to activate/deactivate downlink component carriers and further allows simultaneously scheduling of uplink, respectively downlink resources. According to one aspect of the invention, a new uplink resource assignment format is proposed that is allowing the activation/deactivation of individual downlink component carriers configured for a mobile terminal (referred to as user equipment in the 3GPP terminology). The new uplink resource assignment comprises an indication of the activation state of the configured downlink component carriers, i.e., indicates which downlink component carrier(s) is/are to be activated or deactivated. Furthermore, in accordance with another aspect of the invention, a new downlink resource assignment format is proposed that is allowing the activation/deactivation of individual downlink component carriers configured for a mobile terminal and the simultaneous assignment of downlink resources for the transmission of downlink data to the mobile terminal. The new downlink resource assignment comprises an indication of the activation state of the configured downlink component carriers, i.e., indicates which downlink component carrier(s) is/are to be activated or deactivated.

This indication in both resource assignments may be sent for all configured component carriers, or for all configured component carriers other than the one downlink component carrier which needs to be always activate for a user equipment in RRC connected mode (this component carrier is referred to as the anchor carrier of the user equipment).

Moreover, the indication of the activation state is for example implemented by means of a bit-mask that indicates which of the configured downlink component carriers are to be activated respectively deactivated.

Alternatively, if the proposed resource assignment for uplink, respectively downlink should only activate or deactivate one single configured downlink component carrier, the indication would need to indicate at least an identifier of the configured downlink component carrier to be (de)activated. The indication of the identifier of the configured downlink component carrier would then cause the mobile terminal to toggle the activation state of the indicated downlink component carrier (configured but deactivated⇔active). For signaling the component carrier ID, there would be $\lceil \log_2 (N-1) \rceil$ bits required, given that the anchor carrier cannot be activated/deactivated by the uplink resource assignment, where N is the number of configured component carriers and x is the ceiling function.

As an implicit indication of the activation state may lead to a de-synchronization of the activation states in the mobile terminal and the access network (base station), it may be advantage to include a further additional bit/flag to the uplink resource assignment that is explicitly indicating the activation state (configured but deactivated or active) for the indicated downlink component carrier.

Another alternative possibility to signal the activation state of the configured downlink component carriers would be the use of a single bit/flag that indicates the activation state (configured but deactivated or active) of all downlink component carriers other than the one downlink component carrier which is always active, e.g., the "special" or anchor component carrier in the downlink. This would only allow the simultaneous activation or deactivation of all non-anchor component carriers, but would significantly reduce the signaling overhead.

Considering the use of this new uplink, respectively downlink resource assignment format in a 3GPP based communication system using carrier aggregation in the downlink, such as 3GPP LTE-A (Release 10) or future releases using carrier aggregation, the new resource assignment format may be considered an extension to existing DCI formats, or a new DCI format.

In one exemplary embodiment of the invention, the DCI format of the uplink, respectively downlink resource assignment has the same size as at least one other DCI format defined in the communication system. Furthermore, in a 3GPP based communication system using OFDM on the downlink, it can be assumed that the resource assignment is forming the payload (DCI) of a PDCCH transmitted within a sub-frame on a downlink component carrier to one or more user equipments and the user equipments perform a blind decoding on the different DCI formats signaled in a sub-frame on PDCCH. Using the same size as at least one other DCI format defined in the communication system for the resource assignment format, and using an implicit or explicit indication of this format (as will be explained below in further detail) it is possible not to increase the blind decoding efforts of a mobile terminal.

If using a bit-mask to indicate the activation state of the downlink component carriers configured for a given mobile terminal, each of the bits in the bit-mask is for example associated to a respective configured downlink component carrier of plural configured downlink component carriers, and indicates its activation state. By checking this bit-mask comprised in the uplink, respectively downlink resource assignment, the mobile terminal can determine for each of the configured downlink component carriers, whether the activation state of the respective downlink component carrier is changed, i.e., which one or ones of the configured downlink component carriers need to be activated or deactivated.

In one exemplary embodiment and implementation of the invention, a downlink component carrier could be defined to be in one of the following three activation states: non-configured, configured but deactivated and active. When a downlink component carrier is configured but deactivated, the user equipment does not need to receive the corresponding PDCCH or PDSCH, nor is it required to perform CQI measurements. Conversely, when a downlink component carrier is active, the user equipment shall receive PDSCH and PDCCH (if present), and is expected to be able to perform CQI measurements. After configuration of component carrier(s) same is/are in configured but deactivated state. In order to enable PDCCH and PDSCH reception on a downlink component carrier, the downlink component carrier needs to be transitioned from configured but deactivated state to active state. The new proposed uplink, respectively downlink resource assignment may for example be used for indicating state transitions between configured but deactivated and active ("configured and activated"). If using a bit-mask for this purpose, the logical value 1 of a bit of the bit-mask may indicate the configured downlink component carrier associated to the bit being active, while the logical value 0 of a bit of the bit-mask may indicate the corresponding configured downlink component carrier associated to the bit being configured but deactivated (or vice versa).

Since the proposed uplink/downlink resource assignment is received on one of the configured downlink component carrier, this implies that this downlink component carrier is in active state. For example, the downlink component carrier on which the uplink/downlink resource assignment is received may be (always) a designated "special" component carrier (or anchor component carrier) that is always configured and activated for the mobile terminal. Hence, the uplink resource assignment does not need to (but may) include an indication of the activation state for this special component carrier.

If also an indication of the activation state for the special component carrier is signaled, and irrespective of whether the proposed new uplink/downlink resource assignment is signaled on the special component carrier or another configured component carrier, it may be for example possible to reconfigure the special component carrier by means of the new uplink/downlink resource assignment discussed herein.

Furthermore, in a more advanced exemplary implementation, the uplink resource assignment including the component carrier activation/deactivation information may also instruct the mobile terminal to send a channel quality measurement for the newly activated component carriers (i.e., those component carrier(s) for which the state has changed from deactivated to activated). Accordingly, the mobile terminal performs a channel quality measurement for each activated component carrier and sends the result of the measurement to the base station (referred to as eNodeB in the 3GPP terminology) on the uplink resources that have been assigned to the mobile terminal by means of the uplink resource assignment. The channel quality measurement results may be for example signaled in form of CQI information.

The transmission of the channel quality measurement result(s) indicates to the base station that the mobile terminal has successfully received the uplink resource assignment, respectively, has successfully activated/deactivated the configured downlink component carriers. Hence, the transmission of the channel quality measurement result(s) can be considered an acknowledgment of the uplink resource assignment, respectively the activation/deactivation of configured downlink component carriers by the mobile terminal.

Another aspect of the invention is related to the distinction of the new proposed uplink/downlink resource assignments from an "ordinary" uplink/downlink resource assignment, in particular when assuming that the mobile terminals perform a blind decoding of the downlink control channel information (DCI formats). Hence, the format of the new proposed resource assignments may need to be distinguished from other DCI formats. One possibility is to define a new DCI format (of a new given size) for the resource assignments proposed herein. This may however imply an increase in the blind decoding attempts that need to be performed by the mobile terminal in order to decode the new DCI format. An alternative implementation according to a further embodiment of the invention is to reuse existing DCI formats for signaling an uplink/downlink resource assignment and to provide the distinction of the different uplink resource assignment formats by using unused codepoints in some field(s) of the reused existing DCI format or by means of masking the CRC attachment with a newly defined RNTI defined per mobile terminal for component carrier (de)activation.

For example, when implementing the invention in a 3GPP-based system like LTE-A (Release 10) or its successors, the uplink DCI format 0 as defined for 3GPP LTE (Release 8/9) or the downlink DCI format 1A as defined for 3GPP LTE (Release 8/9), could be reused for (de)activation of downlink component carrier(s). If an uplink/downlink resource assignment that is (de)activating downlink component carrier(s) is signaled, its CRC may be for example scrambled with a new user equipment-specific RNTI defined for this purpose, referred to as CC-RNTI in the following. The CC-RNTI may be for example allocated to a user equipment when the eNodeB configures the set of uplink/downlink component carrier(s). The CC-RNTI may be for example signaled to a user equipment in a RRC Connection Reconfiguration message which includes the set of downlink/uplink component carriers(s) to be aggregated. Hence, by detecting at the user equipment that the CRC attachment of the payload of the PDCCH (i.e., the resource assignment in this case) is masked by the CC-RNTI, the user equipment could thus conclude on the format of the payload of the PDCCH and appropriately read the different fields of the uplink resource assignment including information on the (de)activation of configured downlink component carrier(s).

According to another alternative embodiment of the invention, a CIF field (if present) in the uplink/downlink resource assignment may be used in order to indicate the format of the payload of the PDCCH, i.e., whether the payload is a normal uplink/downlink resource assignment or a uplink resource assignment including information on the (de)activation of configured downlink component carrier(s). As described in the technical background section, the CIF (carrier indicator field) is comprised of three bits and identifies the component carrier for which the specific control signaling information is intended, i.e., in cross-carrier scheduling scenarios. Since three bits offer 8 codepoints, but there could be at most 5 downlink/uplink components configured for an user equipment, some of the CIF codepoints are unused, i.e., codepoints 6, 7 and 8. According to this embodiment, at least one of those unused codepoints of the CIF field is used to indicate that the uplink/downlink resource assignment comprises information on the (de)activation of downlink component carrier(s) and the user equipment will know how to interpret certain bits in the payload of the PDCCH. As the DCI formats for normal uplink/downlink resource assignments (without information on the (de)activation of configured downlink component carrier(s)) and uplink/downlink resource assignments with information on the (de)activation of configured downlink component carrier(s) are distinguished by the codepoint signaled in the CIF field, the same RNTI as used for uplink grants (C-RNTI) can be used to scramble the CRC. Hence, no additional new CC-RNTI would need to be defined in this alternative embodiment.

Furthermore, in another embodiment of the invention, the two possibilities how to indicate the DCI format of the PDCCH payload described above may be used together. As mentioned in the technical background section, in 3GPP LTE-A (Release 10) the presence of CIF in an uplink PDCCH is configurable. Therefore, user equipments that are configured to include CIF in the PDCCH payload, the eNodeB uses the predefined CIF codepoint(s) to indicate that PDCCH payload is a resource assignment with information on the (de)activation of configured downlink component carrier(s). User equipments that are configured to not include CIF in the PDCCH payload will be assigned the CC-RNTI discussed above, which is then used by the eNodeB to distinguish resource assignments with information on the (de)activation of configured downlink component carrier(s) from normal resource assignments (without information on the (de)activation of configured downlink component carrier(s)).

As outlined above, the introduction of a CC-RNTI or the reservation of at least one CIF codepoint allows the redefinition of some of the DCI fields to incorporate the indication of the downlink component carrier(s) to be (de)activated. Exemplarily assuming that there is a maximum of N=5 configured downlink component carriers, and that there is no activation state to be signaled for the specific downlink component carrier which is always active, e.g., the anchor carrier, N−1=4 bits are needed in order to have the possibility to activate/deactivate any combination of downlink component carriers using a bit-mask. Each bit in the bit-mask thereby represents the activation state of one of the downlink component carriers. For example, a bit within the bit-mask set to "1" may indicate that the corresponding downlink component carrier should be activated; a bit set to "0" indicates that the corresponding downlink component carrier should be deactivated (or vice versa).

In one exemplary embodiment of the invention, one of DCI formats already existing in the respective system where the invention is implemented is redefined in order to encompass the signaling of the bit-mask to indicate the (de)activation of the configured downlink component carrier(s). With respect to the implementation of the proposed uplink resource assignment, and if reusing an uplink DCI format 0 already defined in 3GPP LTE (Release 8/9) or 3GPP LTE-A (Release 10), 4 bits need to be redefined in this DCI format in order to be able to signal within the bit-mask (assuming that there is a maximum of N=5 configured downlink component carriers). FIG. 9 shows the DCI format 0 for FDD in 3GPP LTE (Release 8/9). The DCI format 0 consists of:

- a format flag (Flag Format 0/1A) for distinguishing DCI Format 0 and DCI format 1A, which are defined to have the same number of bits/size,
- a hopping flag (Hopping Flag) indicating whether or not the user equipment should employ uplink resource hopping,
- a resource block assignment field assigning uplink resources on the PUSCH to the user equipment (when triggering aperiodic channel quality feedback, the channel quality feedback and optionally further user data is multiplexed and transmitted on these assigned resources via that PUSCH),
- a modulation and coding scheme field (MCS&RV) that is indicating the modulation scheme, coding rate and the redundancy version for the transmission on the assigned resources on the PUSCH,
- a new data indicator (NDI) to indicate whether the user equipment has to send new data or a retransmission,
- a DMRS field (Cyclic Shift DMRS) for configuring the cyclic shift applied to the reference symbol sequence,
- a CQI request flag for triggering an aperiodic channel quality feedback report from the user equipment, and
- if required one or more padding bit(s) to align the size of the dedicated control information to a predetermined number of bits.

Furthermore, as shown in FIG. 10 the extended DCI format 0 in 3GPP LTE-A (Release 10) is essentially similar to the DCI format 0 of 3GPP LTE (Release 8/9), except for further including the CIF field for indicating the uplink component carrier to which the signaled resource assignment pertains in cross-scheduling scenarios.

Under the assumption that the uplink transmission which is scheduled by the uplink resource assignment including the information on the (de)activation of downlink component carrier(s), implies a new initial transmission, the NDI bit, which usually indicates initial/retransmission, can be reused. Similarly the "CQI request" flag could be reused since it could be defined by rule, that the user equipment has always to transmit an aperiodic CQI when downlink component carrier(s) are activated. The remaining two bits which are required for the signaling of the 4-bit bitmask may for example be stolen from the TPC bits, since there are not necessarily required for the transmission of the aperiodic CQI. Robustness of the uplink transmission may also be achieved by properly choosing a conservative modulation and coding scheme, so that no further power control may be required.

Figure 11:
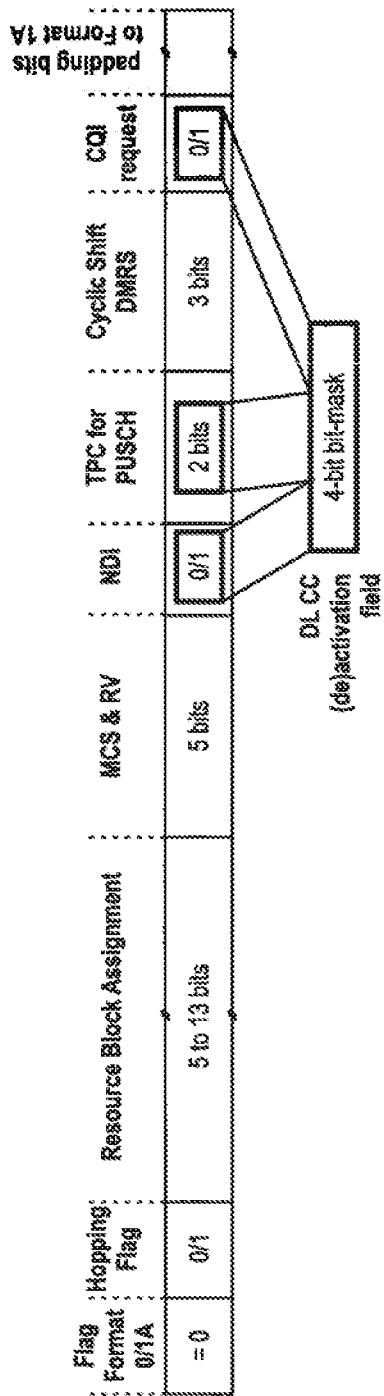
FIG. 11 shows an exemplary improved DCI format 0 for (de)activating configured downlink component carriers for use in 3GPP LTE-A (Release 10) and according to an exemplary embodiment of the invention.

Hence, the user equipment could interpret the content of the decoded downlink control channel information obtained from the PDCCH depending on which RNTI has been used to scramble the CRC code of the CRC attachment. If the CC-RNTI has been used by the base station to mask the CRC of the uplink resource assignment, the user equipment will interpret the NDI flag, the TPC field and the CQI flag of DCI format 0 as a 4-bit bit-mask that indicates which of the configured downlink component carrier(s) is/are to be (de)activated. FIG. 11 shows an exemplary improved DCI format 0 for (de)activating configured downlink component carriers for use in 3GPP LTE-A (Release 10) and according to an exemplary embodiment of the invention, where the NDI flag, the TPC field and the CQI flag are interpreted as a bit-mask, in case the CC-RNTI has been used to scramble the CRC. If the CRC in the CRC attachment has been masked with the C-RNTI, the user equipment interprets the fields of DCI format 0 as defined for 3GPP LTE (Release 8/9) and as shown in FIG. 9—i.e., as a "normal" uplink resource assignment.

Figure 12:
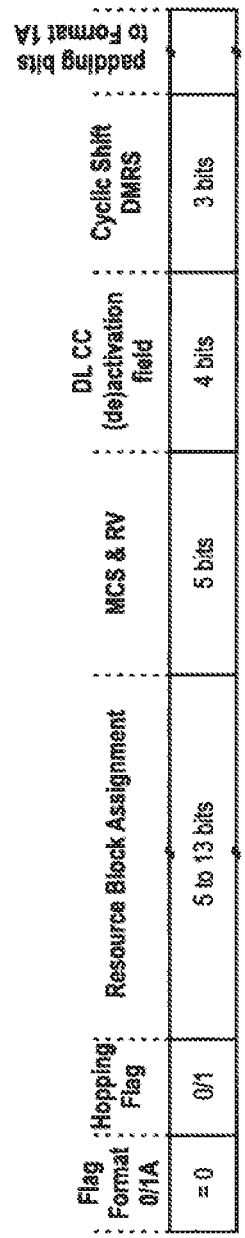
FIG. 12 shows another exemplary improved DCI format 0 for (de)activating configured downlink component carriers for use in 3GPP LTE-A (Release 10) and according to an exemplary embodiment of the invention.

FIG. 12 shows another exemplary improved DCI format 0 for (de)activating configured downlink component carriers for use in 3GPP LTE-A (Release 10) and according to an exemplary embodiment of the invention. In this example, a new DCI format is defined which is based on the DCI format 0 known from 3GPP LTE (Release 8/9). As for the example of FIG. 11, it can be ensured that the size of the format is similar to DCI format 0 and 1A, so that no further blind decoding attempt is needed by the user equipment to decode this new DCI format. In the exemplary DCI format shown in FIG. 12, a new DL CC (de)activation field is defined, which is consisting of 4 bits to convey the bit-mask. As outlined above in connection with FIG. 11, the NDI flag, the TPC field and the CQI flag are omitted in the uplink resource assignment of FIG. 12 to accommodate the DL CC (de)activation field.

Although the exemplary embodiments described above have been explained in connection with reusing the DCI format 0 of 3GPP LTE (Release 8/9), it is likewise possible to reuse DCI format 0 of 3GPP LTE-A (Release 10). In the latter case, the DCI format reuse or the new DCI format of the uplink resource assignment the for (de)activating configured downlink component carriers would look like the examples in FIG. 11 and FIG. 12, except for additionally including a CIF field.

Please also note that the reuse of the NDI flag, the TPC field and the CQI flag is just one example for reusing the fields of the DCI format 0 of 3GPP LTE (Release 8/9) and LTE-A (Release 10). Another option is to reuse the Flag Format 0/1A, the TPC field and the CQI flag or alternatively Flag Format 0/1A, the TPC field and NDI flag to free 4 bits that can be used to signal the bit-mask for (de)activating downlink component carrier(s). If the CC-RNTI is used for indicating the DCI format, the Flag Format 0/A would no longer be needed in the DCI format and could therefore be reused.

Alternatively assuming that the uplink transmission scheduled by the uplink resource assignment should be robust, a modulation scheme yielding high spectral efficiency (such as 64-QAM) would likely not be used for the transmission required. This would allow using only 4 out of the 5 bits for the MCS field for the signaling of the modulation and coding scheme, so that "only" $2^4=16$ MCS levels could be signaled. The "freed" 1 bit of the MCS field could also be used as one bit of the bit-mask. This would for example allow reusing the Flag Format 0/1A, the NDI flag, 1 bit of the MCS field and the CQI flag for the signaling of the 4-bit bit-mask. This way, the TPC commands may still be signaled thereby further improving control of the reliability of the uplink transmission.

Hence, the bit-mask for signaling the activation state of the downlink component carriers may thus be formed by an arbitrary combination of the following fields of DCI format 0 of 3GPP LTE (Release 8/9) or 3GPP LTE-A (Release 10):
Flag Format 0/1A (1 bit),
1 bit of the MCS field,
NDI flag (1 bit),
TPC command field (2 bits), and
CQI request flag (1 bit),
that yields 4 bits for signaling of the bit-mask.

Alternatively, as mentioned previously, if the uplink resource assignment should only activate or deactivate one single configured downlink component carrier, the indication would need to indicate at least an identifier of the configured downlink component carrier to be (de)activated. The indication of the identifier of the configured downlink component carrier would then cause the mobile terminal to toggle the activation state of the indicated downlink component carrier (configured but deactivated↔active). For signaling the component carrier ID, there would be $\lceil \log_2 (N-1) \rceil$ bits required, given that the anchor carrier cannot be activated/deactivated by the uplink resource assignment. For the case of N=5 this would mean that 2 bits would be required to signal the indication of the configured downlink component carrier to be (de)activated, respective 3 bits would be required to signal the indication of the configured downlink component carrier to be (de)activated and an explicit indication of the activation state.

According to another embodiment, DL CC (de)activation field for signaling the activation state of the one downlink component carrier may thus be formed by an arbitrary combination of the following fields of DCI format 0 of 3GPP LTE (Release 8/9) or 3GPP LTE-A (Release 10):
Flag Format 0/1A (1 bit),
1 bit of the MCS field,
NDI flag (1 bit),
TPC command field (2 bits), and
CQI request flag (1 bit),
that yields 2 bits (respectively 3) bits for signaling an identifier the one downlink component carrier to be (de) activated (and the explicit indication of the activation state). One exemplary implementation to obtain 3 bits for signaling an identifier the one downlink component carrier to be (de)activated and the explicit indication of the activation state would be the combination Flag Format 0/1A, NDI flag and CQI request flag. Similarly, also the TPC command field and one of the Flag Format 0/1A, NDI flag and CQI request flag could be used.

In another exemplary embodiment, the activation state of the configured downlink component carriers is signaled by a single bit/flag that indicates the activation state (configured but deactivated or active) of all downlink component carriers other than the one downlink component carrier which is always active, e.g., the "special" or anchor component carrier in the downlink. This allows only a simultaneous activation or deactivation of all non-anchor component carriers, but would significantly reduce the signaling overhead. For signaling this single bit/(de)activation flag one of the following flags:

Flag Format 0/1A (1 bit),
1 bit of the MCS field,
NDI flag (1 bit),
TPC command field (2 bits),
CQI request flag (1 bit)

of DCI format 0 of 3GPP LTE (Release 8/9) or 3GPP LTE-A (Release 10) may be reused.

As to the implementation of the downlink resource assignment enabling the signaling of the activation state of downlink component carriers in the 3GPP context, another embodiment of the invention proposes the reuse or redefinition of downlink DCI format 1A of 3GPP LTE (Release 8/9) or 3GPP LTE-A (Release 10).

The downlink DCI format 1A for FDD mode of 3GPP LTE (Release 8/9) is shown in FIG. 17 and consists of:

a format flag (Flag Format 0/1A) for distinguishing DCI Format 0 and DCI format 1A, which are defined to have the same number of bits/size Localized/Distributed assignment flag—indicating whether the localized or distributed transmission mode is used Resource Block Assignment (RBA) field for assigning downlink resources (resource blocks) on the PDSCH to the user equipment according to the given resource allocation type. The number of bits required for the RBA field depends on the allocation type (RA field) and bandwidth of the assigned component carrier.

modulation and coding scheme field (MCS) that is indicating the modulation scheme, coding rate and the redundancy version for the transmission on the assigned resources on the PDSCH HARQ process number indicating the HARQ process to be used for the downlink transmission on the assigned resources new data indicator (NDI) flag for indicating that the transmission on the given HARQ process is a new protocol data unit (PDU)

redundancy version (RV) field for indicating the redundancy version of the downlink transmission on the assigned resources transmission power control (TPC) command field for transmission of control information on the PUCCH Downlink DCI format 1A of 3GPP LTE-A (Release 10) is shown in FIG. 18 and comprises in addition to the fields of downlink DCI format 1 of 3GPP LTE (Release 8/9) the a carrier indicator field (CIF) for indicating on which of the component carriers the resources are assigned. For TDD mode, the DCI formats 1A of 3GPP LTE (Release 8/9) and 3GPP LTE-A (Release 10) further comprise a Downlink Assignment Index.

According to another embodiment of the invention, the NDI bit of DCI format 1A is reused to provide a flag (DL CC (de)activation flag) that allows the eNodeB to activate or deactivate all downlink component carriers other than the always active downlink component carrier. An example of a new DCI format for the downlink resource assignment comprising the DL CC (de)activation flag is shown in FIG. 19. In another alternative embodiment of the invention, the TPC command for PUCCH field of DCI format 1A or NDI flag and TPC command for PUCCH field are reused and form a DL CC (de)activation field. An exemplary DCI format for the downlink resource assignment is shown in FIG. 20.

Please note that the DCI format in the examples of FIG. 19 and FIG. 20 may further include a CIF field as shown in FIG. 18. In case the NDI flag of the DCI format 1A is reused, it may be desirable to define that the downlink transmission (transport block) to the user equipment on the allocated downlink resources is always an initial transmission, when the proposed downlink resource assignment including the DL CC (de)activation flag is received. Furthermore, the user equipment may also assume a known NDI value for the HARQ process that is providing the downlink transmission.

It should be noted that in all alternatives described above, a reuse of fields of the DCI format and interpretation of the content depending on the RNTI used for the masking of the CRC could be used (as explained in connection with FIG. 11) or the resulting contents of the DCI field can be defined as a new DCI format (as explained in connection with FIGS. 12, 19 and 20).

In the examples on how to signal an indication of the downlink component carrier(s) to be activated or deactivated discussed in the paragraphs above, it has been assumed that the base station assigns a special RNTI (CC-RNTI) to the user equipments for signaling information related to the activation and deactivation of the downlink component carriers configured by a respective user equipment. Based on the use of the CC-RNTI, the user equipments can determine how the DCI format of the uplink/downlink resource assignment received on the PDCCH needs to be interpreted, respectively, which fields are contained therein.

In another alternative implementation according to another embodiment of the invention, the eNodeB uses one of one or more predefined CIF codepoints to indicate that PDCCH payload is an uplink/downlink resource assignment with information on the (de)activation of configured downlink component carrier(s), so that no special RNTI would be needed. The user equipment thus decodes the PDCCH and determines the DCI format (respectively the content/interpretation of the remaining fields in the DCI format) depending on the codepoint signaled in the CIF field. In this case the assigned uplink/downlink resources indicated by the PDCCH is intended for either a predefined uplink/downlink component carrier or for the uplink/downlink component carrier that would be used for the case of non cross-carrier scheduling, i.e., if no CIF field was present. This may be for example the uplink/downlink anchor component carrier of the mobile terminal.

FIG. 13 and FIG. 14 show an exemplary improved uplink DCI format 0 for (de)activating configured downlink component carriers for use in 3GPP LTE-A (Release 10) and according to this embodiment of the invention, where the interpretation of the content of the DCI format is depending on the codepoint of the CIF field. If the codepoint of the CIF field is "111", the DCI format (uplink resource assignment) comprises a DL CC (de)activation field for signaling the activation state of the downlink component carriers (see FIG. 13), while in case the codepoint is not "111", the DCI format is the DCI format 0 as shown in FIG. 10, and the CIF field indicate the cross-scheduled component carrier on which the uplink resources are assigned. Please note that the definition of special CIF codepoint(s) for indicating the DCI format is of course also applicable to the DCI format as shown in FIG. 19 and FIG. 20 for the downlink assignment case, assuming that a CIF field is added to the formats.

In another alternative implementation according to another embodiment of the invention, two predefined CIF codepoints are used for indication that the DCI format (resource assignment) comprises information identifying at least one DL component carrier which is to be activated respectively deactivated. If the codepoint of the CIF field is "111", the DCI format (resource assignment) indicates the activation of the at least one downlink component carrier identified by the identifier field, whereas when if the codepoint of the CIF field is "110" the DCI format indicates the deactivation of the at least one downlink component carrier identified by the identifier field in the DCI format.

Furthermore another aspect of the invention relates to the transmission of the aperiodic CQI in response to a downlink component carrier (de) activation. As explained above, in one example implementation, the activation of a downlink component carrier (transition from configured but deactivated state to active state) by means of an uplink resource assignment, causes the mobile terminal to perform a channel quality measurement for each of the newly activated component carrier and to signal the results of the measurement to the base station. Since it may not always be required or beneficial for the base station to receive CQI information when (de)activating downlink component carriers, it may be desirable for the base station to have the possibility to enable/disable the transmission of the channel quality measurements. In implementations where the CQI request flag is not used for signaling the indication of the activation status of the downlink component carriers, the CQI request flag could be used by the base station to control the transmission of CQI information for the newly activated downlink component carriers.

For cases where the CQI request flag is used for signaling the indication of the activation status of the downlink component carriers, according to one embodiment of the invention, it is proposed to control the transmission of channel quality feedback/CQI by setting the codepoint signaled in the Resource Block assignment (RBA) field. For example setting the RBA field to all "1"s, which is an invalid resource allocation, the base station may disable the channel quality feedback/CQI reporting. The user equipment would still (de)activate the downlink component carrier(s) as signaled, however without transmitting channel quality feedback/CQI information for the newly activated component carriers.

Another possibility to suppress channel quality reporting is related to the use of the CIF flag for distinguishing the uplink resource assignment formats (as explained in connection with FIG. 13 and FIG. 14 above). Since more that one CIF codepoint may not be needed, two codepoints may be reserved to indicate the format of the uplink resource assignment. One of these two codepoints could be defined to indicate the uplink resource assignment comprising information on the (de)activation of downlink component carrier (s) and requests the mobile terminal to report channel quality on the newly activated downlink component carriers, while the other of the two codepoints could be defined to indicate the uplink resource assignment comprising information on the (de)activation of downlink component carrier(s) and requests the mobile terminal not to report channel quality on the newly activated downlink component carriers.

In order to provide sufficient robustness for the downlink component carrier (de)activation signaling, it is proposed in another embodiment of the invention that a transmission on the uplink resources allocated by the uplink resource assignment (comprising the information on the downlink component carrier (de)activation) serves as an acknowledgement for the reception of the uplink resource assignment. Hence, if the channel quality is reported on the assigned uplink resources, upon reception of this channel quality information at the base station, same can assume that the uplink resource assignment (comprising the information on the downlink component carrier (de)activation) was correctly received by the mobile terminal.

Figure 15:
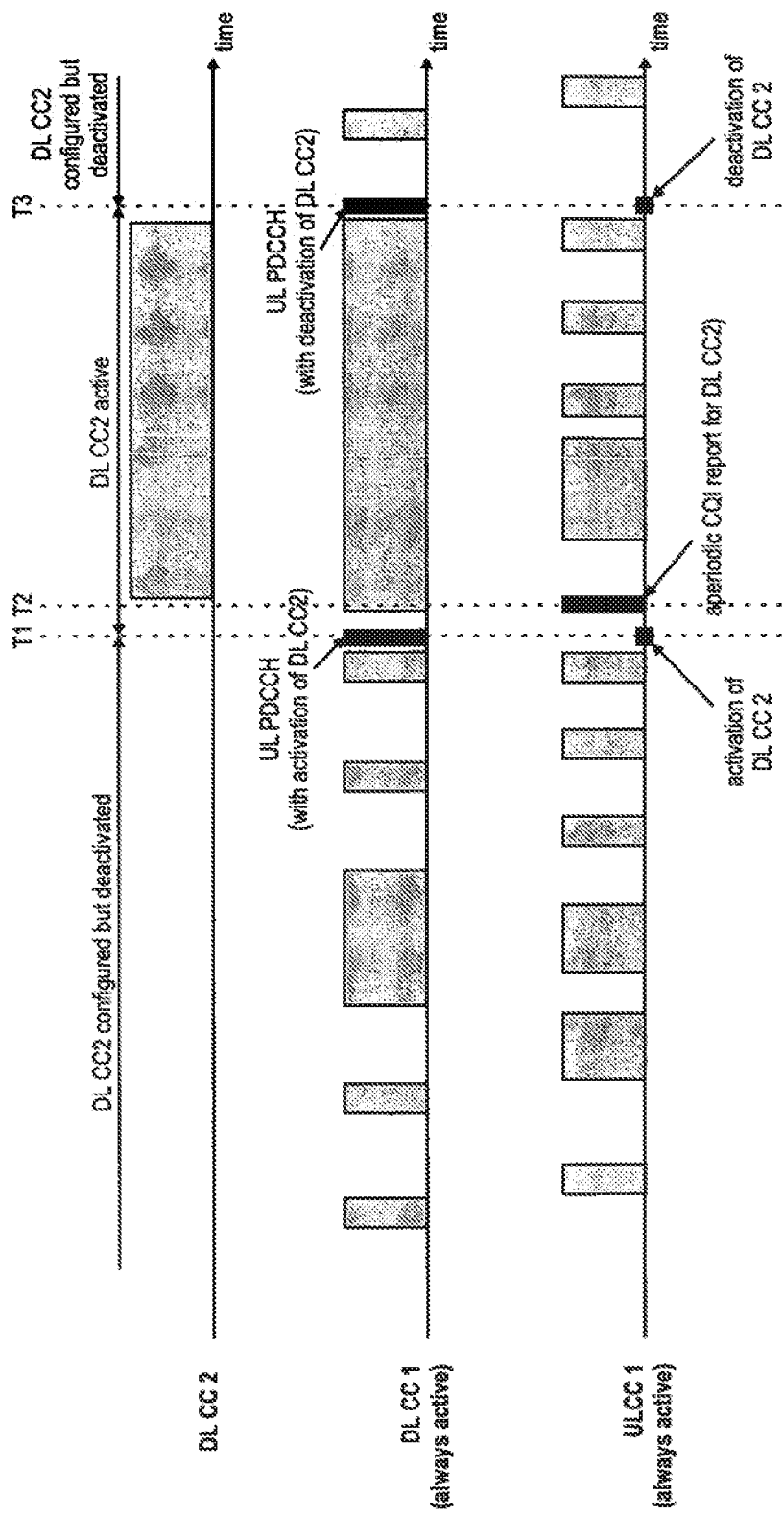

FIG. 15 exemplifies the procedure for the (de)activation of downlink component carriers in an exemplary 3GPP-based communication system according to an embodiment of the invention. It is exemplarily assumed that there are two downlink component carriers (DL CC1 and DL CC2) and one uplink component carrier (UL CC1) configured for carrier aggregation. First, DL CC2 is deactivated and only DL CC1 and UL CC1 are active (UL CC1 and DL CC1 are always active, since the user equipments needs to always have at least one active uplink and downlink component carrier in RRC connected mode).

At time T1, e.g., when DL traffic demand increases, the eNodeB activates DL CC2 for the user equipment by sending an uplink resource assignment (UL PDCCH) scrambled with CC-RNTI which initiates the activation of DL CC2. Upon reception of the uplink resource assignment at the user equipment, the user equipment activates DL CC2, e.g., start monitoring for corresponding PDCCH/PDSCH, and measures channel quality (CQI information) for DL CC2. The format of the CQI could be for example preconfigured by eNodeB, so that the user equipment is aware whether it should report a wide-band CQI or a frequency-selective CQI. The user equipment transmits at time T2 the calculated CQI information on the PUSCH resource assigned on the uplink (UL CC1) by the uplink resource assignment received at time T1. The CQI information is transmitted 4 ms after reception of the uplink resource assignment received at time T1, similar to the implementation foreseen in 3GPP LTE (Release 8/9).

After some number of sub-frames in which eNodeB transmitted downlink data on both activated downlink component carriers DL CC1 and DL CC2, the eNodeB decides to deactivate DL CC2. Accordingly, the eNodeB sends at time T3 another uplink resource assignment (UL PDCCH) scrambled with CC-RNTI and corresponding bit-mask that indicates the deactivation of DL CC2. Since CQI information for a deactivated downlink component carrier may not be useful, the eNodeB may sets the RBA field to all "1"s, in order to disable CQI transmission.

It should be also noted that since an the uplink resource assignments at times T1 and T3 are used for the activation, respectively deactivation of downlink component carrier DL CC2, the eNodeB can simultaneously (de)activate the downlink component carrier and transmit downlink data on the anchor carrier, i.e., DL CC1.

According to some embodiments discussed above, channel quality feedback has been provided by means of CQI information, i.e., aperiodic CQI, in the uplink on the PUSCH resources assigned by the uplink resource assignment activating downlink component carrier(s). In a further embodiment, in addition to the channel quality information reported for the newly activated downlink component carrier(s), the mobile terminal may optionally further transmit sounding reference signal(s) (SRS) on the uplink component carrier(s) which are linked to the activated downlink component carrier(s) and/or Power Headroom Report (PHR) information for the uplink component carrier(s) which are linked to the newly activated downlink component carrier(s). The PHR information is sent on the uplink resources assigned by the uplink resource assignment. The SRS and PHR information is for example useful for eNodeB in order to efficiently schedule PUSCH transmissions.

Therefore, according to this embodiment of the invention, the base station may also schedule PHR transmissions and/or SRS when activating downlink component carrier(s).

Hence, instead of or in addition to reporting the channel quality of activated downlink component carriers on the uplink resources that have been assigned by the new proposed plink resource assignment, the mobile terminal may also signal scheduling related information to the base station such as SRS and/or PHR reports.

Figure 16:
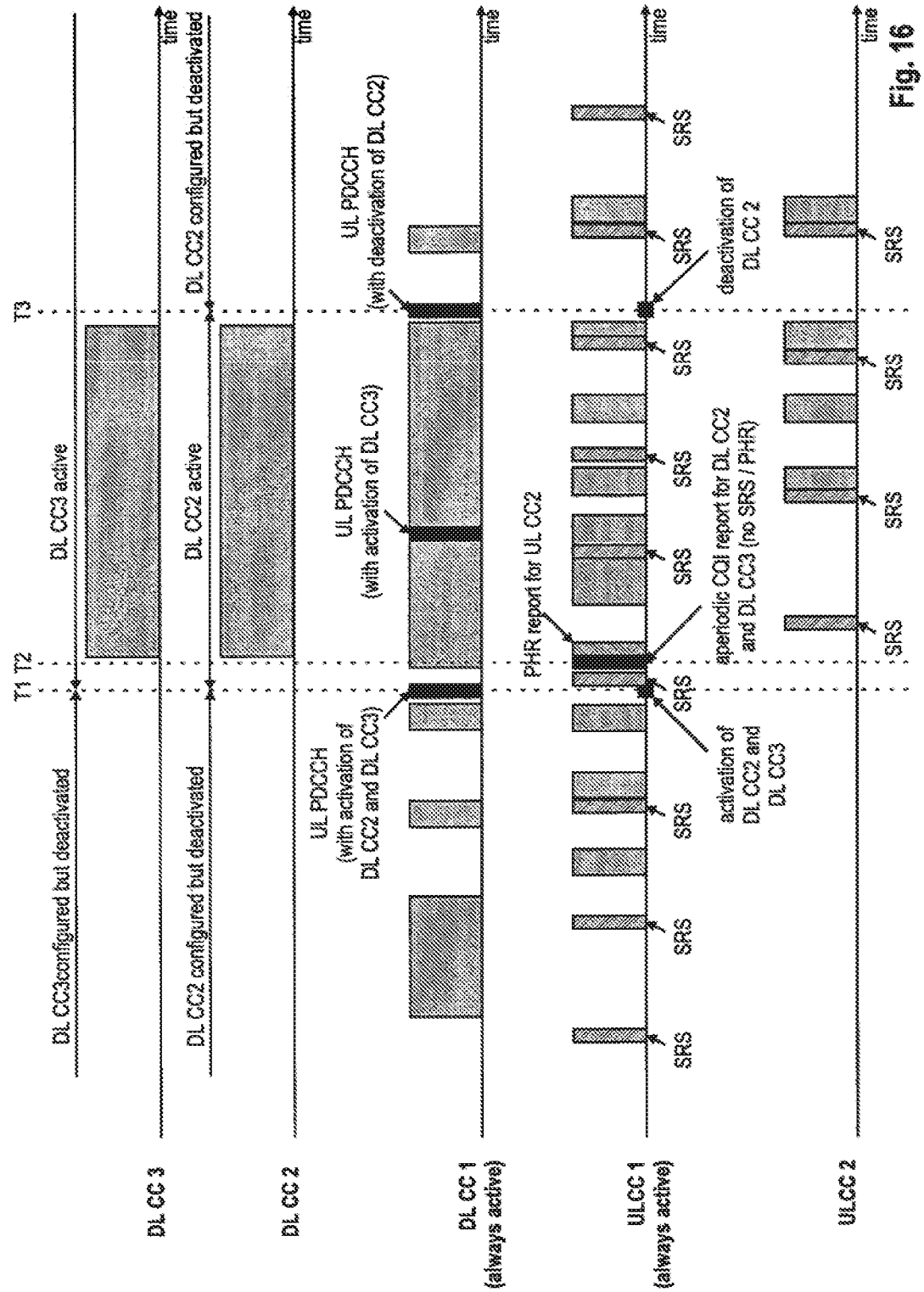

In the exemplary scenario shown in FIG. 16, the power headroom information for UL CC2 is transmitted on UL CC1. Since there is no uplink resource assignment on UL CC2 for the sub-frame in which the user equipment should calculate the power headroom for UL CC2, according to a further aspect and embodiment of the invention, the calculation of the power headroom for UL CC2 is redefined in comparison to 3GPP LTE (Release 8/9). In 3GPP LTE (Release 8/9) a power headroom report can only be sent in sub-frames where user equipment has an uplink assignment for transmission on the PUSCH (transport block), since the power headroom indicates the difference between the nominal user equipment's maximum transmit power and the estimated power for the assigned uplink transmission on the PUSCH. For the case there is no uplink assignment on an uplink component carrier for which a power headroom is to be reported, it is therefore proposed that the power headroom for the uplink component carrier which has no uplink resource assignment for the sub-frame in which power headroom should be determined is calculated by using a preconfigured reference uplink resource allocation. Essentially, the power headroom is then indicating in the difference between the nominal user equipment's maximum transmit power and the estimated power for the uplink transmission according to the preconfigured reference uplink resource allocation. The preconfigured reference uplink resource allocation may be for example signaled to the user equipment by radio resource control (RRC) signaling.

Similarly as for the channel quality reporting, also the transmission of SRS respectively PHR is not in all cases beneficial/required. Therefore similar to the embodiments described above, the base station may also enables/disables SRS and/or PHR reporting when activating or deactivating downlink component carrier(s). This could be achieved by similar mechanisms explained above for the suppression of channel quality feedback. Hence, including a special flag to the uplink resource assignment or defining special codepoints in the CIF field or RBA field of the uplink resource assignment could be used to indicate to the mobile terminal whether it is required to send SRS and/or PHR reports.

Alternatively, a predetermined rule could define whether SRS/PHR information should be transmitted. For example, the mobile terminal only sends SRS on the linked uplink component carrier and/or send PHR information for the linked uplink component carrier(s), in case the linked uplink component(s) are not yet active, i.e., no PUSCH/PUCCH transmissions were made by the mobile terminal on the linked uplink component carrier(s).

Figure 8:
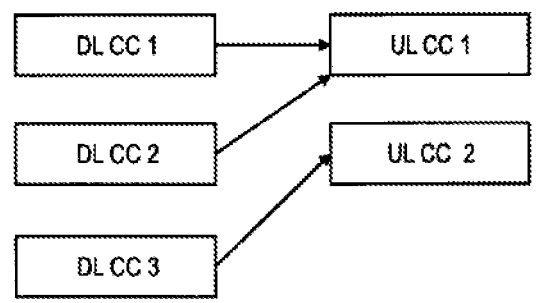

Considering the scenario shown in FIG. 8 as a configuration example of a user equipment, the transmission of SRS/PHR for the downlink component carrier activation case will be highlighted in the following with respect to FIG. 16. The assumption is that only DL CC1 and UL CC1 are currently activated and the eNodeB decides to also activate DL CC2 and DL CC3 at time T1. The eNodeB signals the proposed uplink resource assignment to the user equipment indicating to activate those DL CC2 and DL CC3. Furthermore the uplink resource assignment orders the user equipment to also send PHR information for the uplink component carrier(s) linked to the new activated downlink component carrier(s)—i.e., UL CC1 and UL CC2 in this example—and to transmit SRS on the linked uplink component carriers(s).

Upon the reception of the new proposed uplink resource assignment the user equipment's behavior according to one embodiment of the invention would be the following: The user equipment activates DL CC2 and DL CC3. Furthermore, the user equipment will measure CQI information on the two newly activated DL CCs and sends at time T2 the CQI reports for DL CC2 and DL CC3 on the uplink resources on UL CC1 assigned by the uplink resource assignment. Additionally, the user equipment will send power headroom information for UL CC2 on the assigned resources on UL CC1, as the activated DL CC3 is linked UL CC2. Moreover, user equipment will start transmitting SRS on UL CC2.

According to a further embodiment of the invention, the configuration parameters for the SRS transmission are signaled to the user equipment via higher layer signaling, i.e., RRC signaling. For example when configuring the user equipment with the set of downlink and uplink component carrier(s) for carrier aggregation, the configuration message may also include the SRS configuration parameters for a specific uplink component carrier. Those configuration parameters may for example include the sub-frame configuration, i.e., set of sub-frames in which SRS may be transmitted within a radio frame, a periodicity and sounding bandwidth. Similarly also the configuration related to channel quality measurements on a downlink component carrier, i.e., transmission mode and reporting mode may be signaled within the component carrier configuration message.

Another embodiment of the invention relates to an improved deactivation mechanism for the downlink component carriers in a 3GPP-based communication system, e.g., 3GPP LTE-A (Release 10). As outlined above, it may not be always required/beneficial when user equipment reports CQI information in response to a deactivation of a component carrier. For example, for the deactivation case there does not seem to be a good motivation to send CQI information for a downlink component carrier which has just been deactivated. Therefore the uplink resource allocation related field in the uplink resource assignment, i.e., RBA field, MCS filed, UL hopping flag, and the DMRS field could be used for some other purpose.

When user equipment monitors the PDCCH, there is always a certain probability (false alarm rate) that the mobile terminal falsely detects a PDCCH: the CRC check of the PDCCH may be correct even though the PDCCH was not intended for this user equipment, i.e., CRC passes even though there is a RNTI mismatch (unintended user). This so called false alarm might happen, if the two effects of transmission errors caused by the radio channel and RNTI mismatch cancel each other. The probability of a falsely positive decoded PDCCH depends on the CRC length. The longer the CRC length, the lower the probability that a CRC-protected message is falsely correct decoded. With the CRC size of 16 bit the false alarm probability would be $1.5 \cdot 10^{-5}$.

In case a user equipment falsely detects a PDCCH with an uplink resource assignment indicating the deactivation of certain downlink component carrier(s) the user equipment would stop monitoring PDCCH/PDSCH for those indicated downlink component carrier(s) and also stops reporting CQI measurements. Given the severe consequences of such user equipment behavior, it is therefore desirable to decrease the false alarm probability. One mean to lower the false alarm rate to an acceptable level proposed in this embodiment is to use a "Virtual CRC" in order to expand the 16-bit CRC. That is, the length of CRC field can be virtually extended by setting fixed and known values to one or more of the DCI fields of the uplink resource assignment signaled on the PDCCH that are not useful for downlink component carrier deactivation, such as RBA field, MCS filed, UL hopping flag, and the DMRS field. The user equipments shall ignore the PDCCH comprising the uplink resource assignment for downlink carrier deactivation, if the values in these fields are not correct (i.e., are not corresponding to the known values). Since uplink resource allocation related DCI fields are essentially not required for the case of downlink component carrier deactivation, those fields could be used to extend the CRC virtually and thereby decreasing the false alarm probability. Similar mechanism for extending the CRC length virtually in order to further decrease the false alarm rate as described may be also applied for the DL component carrier activation case.

Another aspect of the invention is related to the HARQ protocol operation for the HARQ process used for transmitting the uplink resource assignment for (de)activation of downlink component carrier(s). It should be noted that this applies only to the case where there is a transmission (transport block) on the uplink shared channel (UL-SCH) scheduled by the uplink resource assignment indicating a downlink component carrier (de)activation, e.g., PHR information is scheduled for transmission on the uplink shared channel. Please note that this is in contrast to the transmission of an aperiodic CQI on the physical uplink shared channel (PUSCH), there is no transport block transmission involved, i.e., only physical layer transmission on PUSCH. Since the NDI which is usually used for HARQ process management, i.e., toggled NDI indicates initial transmission, may be reused in some implementations for indication of the activation state of the downlink component carrier(s), some new user equipment behavior may need to be defined for these implementations.

One approach according to an embodiment of the invention is that the user equipment ignores an uplink resource assignment indicating the (de)activation of downlink component carrier(s), when determining whether the NDI has been toggled compared to the value in the previous transmission.

Alternatively, in another embodiment of the invention, the user equipment sets the NDI value for the HARQ process used for transmitting the resource assignment indicating the (de)activation of downlink component carrier(s) to some predefined value, e.g., zero/one. As the eNodeB would be aware of this behavior, it could also set the NDI value in the HARQ status information accordingly to the predefined value for the HARQ process used for transmitting the resource assignment indicating the (de)activation of downlink component carrier(s). This allows for a correct HARQ process management for further initial/retransmission on this HARQ process.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A communication method comprising:
   connecting to a Mobility Management Entity (MME) by means of an S1-MME interface and to a Serving Gateway (SGW) by means of an S1-U interface;
   generating resource assignment information including a plurality of bits that indicate activation or deactivation statuses of respective downlink component carriers, the downlink component carriers being secondary downlink component carriers added to a primary component carrier which is always activated, each of the downlink component carriers corresponding to one bit included in the plurality of bits, and the one bit indicating that a corresponding downlink component carrier is to be activated or deactivated, wherein when any one bit of the plurality of bits indicates that its corresponding downlink component carrier is to be activated, the plurality of bits jointly indicate the activation or deactivation statuses, a sounding reference signal (SRS) transmission request and a channel quality information (CQI) reporting request;
   transmitting the generated resource assignment information; and
   receiving a SRS and a CQI that are transmitted, in response to the SRS transmission request and the CQI reporting request, on an uplink component carrier linked to an activated downlink component carrier(s).

2. The communication method according to claim 1, wherein the CQI is received for each of the activated downlink component carrier(s), wherein the CQI is generated for each of the activated downlink component carrier(s) at a communication partner apparatus.

3. The communication method according to claim 2, wherein the CQI is received on uplink resources assigned by the transmitted resource assignment information.

4. The communication method according to claim 1, further comprising:
   transmitting SRS configuration parameters for SRS transmission via higher layer signaling, the SRS configuration parameters comprising a periodicity and a sounding bandwidth.

5. The communication method according to claim 1, wherein the plurality of bits include at least one unused bit.

6. The communication method according to claim 1, wherein the resource assignment information comprises a CRC field that is masked with a radio network temporary identifier (RNTI) assigned to a mobile terminal for the activation and deactivation of downlink component carriers.

7. The communication method according to claim 6, wherein at least one codepoint of a carrier indicator field (CIF) of the resource assignment information indicates whether the resource assignment information includes a bit-mask for (de)activating the downlink component carriers, or whether an uplink resource assignment is not used for (de)activation of the downlink component carriers and only used for assigning uplink resources.

8. A communication apparatus comprising:
   connecting circuitry, which, in operation, connects to a Mobility Management Entity (MME) by means of an S1-MME interface and to the Serving Gateway (SGW) by means of an S1-U interface;
   generating circuitry, which, in operation, generates resource assignment information including a plurality of bits that indicate activation or deactivation statuses of respective downlink component carriers, the downlink component carriers being secondary downlink component carriers added to a primary component carrier which is always activated, each of the downlink component carriers corresponding to one bit included in the plurality of bits, and the one bit indicating that a corresponding downlink component carrier is to be activated or deactivated, wherein when any one bit of the plurality of bits indicates that its corresponding downlink component carrier is to be activated, the plurality of bits jointly indicate the activation or deactivation statuses, a sounding reference signal (SRS) transmission request and a channel quality information (CQI) reporting request;
   a transmitting circuitry coupled to the generating circuitry, which, in operation, transmits the generated resource assignment information; and
   a receiving circuitry, which, in operation, receives a SRS and a CQI that are transmitted, in response to the SRS transmission request and the CQI reporting request, on an uplink component carrier linked to an activated downlink component carrier(s).

9. The communication apparatus according to claim 8, wherein the CQI is received for each of the activated downlink component carrier(s), wherein the CQI is generated for each of the activated downlink component carrier(s) at a communication partner apparatus.

10. The communication apparatus according to claim 9, wherein the CQI is received on uplink resources assigned by the transmitted resource assignment information.

11. The communication apparatus according to claim 8, wherein the transmitter further transmits SRS configuration parameters for SRS transmission via higher layer signaling, the SRS configuration parameters comprising a periodicity and a sounding bandwidth.

12. The communication method according to claim 8, wherein the plurality of bits include at least one unused bit.

13. The communication method according to claim 8, wherein the resource assignment information comprises a CRC field that is masked with a radio network temporary identifier (RNTI) assigned to a mobile terminal for the activation and deactivation of downlink component carriers.

14. The communication method according to claim 13, wherein at least one codepoint of a carrier indicator field (CIF) of the resource assignment information indicates whether the resource assignment information includes a bit-mask for (de)activating the downlink component carriers, or whether an uplink resource assignment is not used for (de)activation of the downlink component carriers and only used for assigning uplink resources.

* * * * *

UNITED STATES PATENT AND TRADEMARK OFFICE
CERTIFICATE OF CORRECTION

PATENT NO. : 11,005,640 B2
APPLICATION NO. : 16/867426
DATED : May 11, 2021
INVENTOR(S) : Joachim Loehr Page 1 of 1

It is certified that error appears in the above-identified patent and that said Letters Patent is hereby corrected as shown below:

On the Title Page

On page 2, Column 2, Item (56) References Cited/Other Publications Lines 17-20:
"Ericsson, ST-Ericsson, "Summary of the email discussion [68423] LTE:CC activation/deactivation," R2-100079, 3GPP TSG-RAN WG2 #68bis, Agenda Item: 7.1.3, Valencia, Spain, Jan. 18-22, 2010, 17 pages."
Should read:
--Ericsson, ST-Ericsson, "Summary of the email discussion [68#23] LTE:CC activation/deactivation," R2-100079, 3GPP TSG-RAN WG2 #68bis, Agenda Item: 7.1.3, Valencia, Spain, Jan. 18-22, 2010, 17 pages.--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*